(12) United States Patent
Cohen

(10) Patent No.: US 10,561,121 B2
(45) Date of Patent: Feb. 18, 2020

(54) ORNAMENT ASSEMBLY

(71) Applicant: Alan J. Cohen, Laurel Hollow, NY (US)

(72) Inventor: Alan J. Cohen, Laurel Hollow, NY (US)

(*) Notice: Subject to any disclaimer, the term of this patent is extended or adjusted under 35 U.S.C. 154(b) by 0 days.

(21) Appl. No.: 16/111,002

(22) Filed: Aug. 23, 2018

(65) Prior Publication Data

US 2019/0053472 A1 Feb. 21, 2019

Related U.S. Application Data

(63) Continuation of application No. 16/034,991, filed on Jul. 13, 2018, which is a continuation-in-part of application No. 16/028,895, filed on Jul. 6, 2018, which is a continuation of application No. 15/699,734, filed on Sep. 8, 2017, now abandoned, which is a continuation of application No. 15/694,035, filed on Sep. 1, 2017, now abandoned, which is a continuation-in-part of application No. 15/638,082, filed on Jun. 29, 2017, now abandoned.

(60) Provisional application No. 62/465,346, filed on Mar. 1, 2017.

(51) Int. Cl.
    *A01K 63/00* (2017.01)
(52) U.S. Cl.
    CPC .................. *A01K 63/006* (2013.01)
(58) Field of Classification Search
    CPC .... A01K 63/006; A01K 63/003; A01K 63/00; A01K 63/02
    USPC .................. 119/256; D30/101–107
    See application file for complete search history.

(56) References Cited

U.S. PATENT DOCUMENTS

| | | | |
|---|---|---|---|
| 3,744,454 A | 7/1973 | Willinger et al. | |
| 4,006,711 A | 2/1977 | Frank | |
| 4,318,945 A | 3/1982 | Goldman et al. | |
| 4,385,088 A | 5/1983 | Baskin | |
| 4,820,556 A | 4/1989 | Goldman et al. | |
| 4,967,694 A | 11/1990 | Waldman | |
| 4,974,545 A | 12/1990 | Jones | |
| 5,018,480 A * | 5/1991 | Goldman | A01K 31/12 119/468 |
| 5,083,528 A * | 1/1992 | Strong | A01K 63/003 119/225 |
| D327,142 S * | 6/1992 | Pilgrim, Jr. | D30/106 |
| 5,367,985 A * | 11/1994 | Wilkins | A01K 63/042 119/263 |
| 5,451,443 A | 9/1995 | Wechsler | |

(Continued)

FOREIGN PATENT DOCUMENTS

KR 170000173 U 1/2017
WO PCT/US2019/041295 10/2019

OTHER PUBLICATIONS

U.S. Patent and Trademark Office, International Search Report and Written Opinion for PCT Application No. PCT/US2018/020122, dated Jul. 24, 2018.

*Primary Examiner* — Joshua D Huson
(74) *Attorney, Agent, or Firm* — Stuart S. Levy

(57) ABSTRACT

A system of decorating a housing that includes a base and a plurality of decorative elements. The decorative elements are irremovably disposed on or partially in the base. The width and depth of the base is less than or equal to the width and depth of the bottom inner surface dimensions of the housing such that the bottom inner surface area of the housing is entirely covered by one or more bases.

8 Claims, 23 Drawing Sheets

(56) References Cited

U.S. PATENT DOCUMENTS

| | | | |
|---|---|---|---|
| 5,855,982 | A | 1/1999 | Wechsler |
| 6,006,471 | A | 12/1999 | Sun |
| 6,422,175 | B1 | 7/2002 | Rudolph |
| 6,672,250 | B1 | 1/2004 | Traylor et al. |
| 7,020,946 | B2 | 4/2006 | Mele |
| RE39,379 | E * | 11/2006 | Wechsler ................. 428/99 |
| 7,836,853 | B2 | 11/2010 | Locklear |
| 8,505,490 | B1 | 8/2013 | Clonan |
| 8,844,468 | B2 | 9/2014 | Lockwood |
| 9,239,139 | B2 | 1/2016 | McCauley |
| 2002/0083901 | A1 | 7/2002 | Rudolph |
| 2003/0093947 | A1 * | 5/2003 | Gilberg ................. A01G 9/02 47/41.01 |
| 2005/0061717 | A1 | 3/2005 | Smith |
| 2006/0272962 | A1 | 12/2006 | Chan |
| 2008/0022590 | A1 | 1/2008 | Chen |
| 2009/0114162 | A1 * | 5/2009 | Locklear ............ A01K 63/006 119/256 |
| 2012/0096570 | A1 * | 4/2012 | Tran ................. A01K 63/006 800/8 |
| 2014/0209034 | A1 * | 7/2014 | Lockwood ......... A01K 63/006 119/256 |
| 2015/0230436 | A1 | 8/2015 | Lutz et al. |
| 2015/0313190 | A1 | 11/2015 | Edwards |
| 2016/0242396 | A1 | 8/2016 | Fredricks |

\* cited by examiner

ORNAMENT ASSEMBLY

This patent application is a continuation of U.S. patent application Ser. No. 16/034,991, filed Jul. 13, 2018, which is a continuation in part of U.S. application Ser. No. 16/028,895 filed on Jul. 6, 2018 which is a continuation of U.S. patent application Ser. No. 15/699,734 filed on Sep. 8, 2017 which is a continuation of U.S. patent application Ser. No. 15/694,035 filed Sep. 1, 2017 which is a continuation in part of U.S. patent application Ser. No. 15/638,082, filed on Jun. 29, 2017 which claims benefit of U.S. Provisional Patent Application No. 62/465,346, filed on Mar. 1, 2017, each of which are hereby incorporated by reference in their entirety as part of the present disclosure.

FIELD OF THE INVENTION

The present invention relates generally to a decoration and more specifically to at least one ornament assembly that includes a base that substantially encompasses an entire surface area of a bottom wall of a housing and into which base various decorative elements are irremovably disposed. Said base having a shape that can encompass an interior surface of a housing that is of a non-uniform shape, including, but not limited to a sloped, curved, semi-circular, global and drum-shaped.

BACKGROUND OF THE INVENTION

Decorative ornaments are commonly used in connection with aquariums, terrariums and other housings in addition to being standalone objects. For example, various decorations are regularly placed in aquariums to improve visual aesthetics and to provide fish and/or animals housed in the aquarium with an artificial environment akin to their natural habitat. Such decorations usually include a layer of material such as gravel and/or sand that can be one or more of a variety of colors, live and/or plastic plants, and other decorative objects such as coral, sunken ships, treasure chests, rocks, and/or signage.

To create an aesthetically appealing effect in an aquarium, items must be purchased and then arranged in the aquarium. However, many individuals lack the creativity, know-how, time, and/or the patience to select and decorate an aquarium. Additionally, consumers do not always have access to décor which they desire.

An aquarium, terrarium, or other housing is a habitat for fish, reptiles, or other creatures. It is a delicately balanced ecosystem created for fish, reptiles or other creatures to thrive. Abrupt changes to such an ecosystem can alter the environment and endanger the lives of the fish, reptiles or other creatures. These enclosures require regular cleaning to ensure the viability of life housed therein and the overall cleanliness thereof. This is often a very time-consuming process that requires the temporary removal of fish and/or other animals, movement or removal of gravel and/or other decorative elements and at least in the case of an aquarium, the displacement and discarding of water from the aquarium (usually into a drain or toilet) that requires careful attention not to accidently include gravel or other decorative elements so as to not discard such decorative elements with the displaced water, damaging the elements and/or possibly clogging the drain/toilet into which the water is being discarded.

The soiled gravel and/or other decorative elements must be cleaned or replaced, and regardless of whether the decorative elements are cleaned or replaced, the movement and/or removal of gravel and/or decorative elements in order to clean an aquarium requires a significant commitment in both time and energy to move and/or remove the items, clean the items or replace them with a new scheme and ensure the vitality of the aquatic life housed in the aquarium. Should one decide not to remove all decorative items and water from a housing when cleaning, commonly, material arranged on the base of the aquarium will be displaced and mixed with the water in the housing. If not handled properly, in the case of aquariums, the stirring of loose gravel when adding or moving décor, can alter the environment and create a toxic environment by causing high levels of ammonia gas and nitrates to be released into the aquarium water. The high gaseous levels, which emanate from waste from fish and/or animals in the aquarium and food particles not consumed that naturally break down in the material (e.g., gravel) placed on the base of the aquarium, can often damage the protective body-coating of fish and their delicate fins. The harsh nature of the gases can also lead to the onset of disease to the fish contained in the aquarium, and commonly leads to fish dying soon after being exposed to such gases (e.g., within about twenty-four hours). This is a frequent problem for consumers, especially those new to fishkeeping. The same applies to reptiles and small animals. Thus, there are many challenges and concerns with creating a desired decorative environment, cleaning an aquarium that includes a decorative environment and recreating a decorative environment after cleaning the aquarium.

SUMMARY OF THE INVENTION

Accordingly, the present invention is directed to a decorative ornament assembly that substantially obviates one or more of the problems due to limitations and disadvantages of the related art.

An object of the invention is to provide a decorative ornament assembly that fits within and covers the entire inner surface area of a container, such as a fish tank, all which may have different inner surface widths, lengths, depths and circumferences.

Another object of the invention is to simplify the cleaning process of a housing, such as an aquarium, by allowing a user to quickly remove the decorative ornament assembly in one step rather than having to remove decorative elements in an open container, such as gravel, plants, and ornaments, individually.

Yet another object of the invention is to simplify the decoration process of a holding container, such as an aquarium, by allowing users to insert a preconfigured decorative ornament assembly with all of the decorative elements affixed to it in advance rather than the user having to individually purchase and insert various decorative items, such as plants, gravel, and ornaments, into a holding container or removable substrate. The preconfigured decorative ornament, once installed in a container, looks as if the user selected and separately placed the substrate and various decorative ornaments while the user in fact only has to purchase it and put it in place.

In an embodiment, the present invention is directed to an ornament assembly configured to be arranged within a housing that includes at least one sidewall. The ornament assembly comprises a base delimited at an outer periphery and a plurality of decorative elements that are at least one of irremovably disposed on and partially fixed within the base prior to receipt by the user. The base is configured to extend substantially about an interior space of the housing such that the base is contactable with the at least one sidewall of the housing.

The base can extend across an entire surface area of a portion of the housing such that the entire portion of the housing is covered by the base. Alternatively, the portion of the housing can be entirely covered by two or more bases.

The base can be comprised of at least one of gravel, sand, marbles, stones, plastic, paper, or any other type of suitable base material which are bound together to form a solid structure. The decorative elements can include plants, rocks, sunken ships, treasure chests, statues, signage, castles, and other decorative subject matter that appeals to consumers.

The base can include at least one decorative ornament which is permanently affixed to the base and shaped so that it can be securely grasped by one hand of a user and used to lift the ornament assembly out of the housing using only one hand. This decorative ornament can be spaced towards the center of the base and away from the side walls and can have a footprint on the base which encompasses the center of gravity along the plane of the base to make it easier for a user to keep the ornament assembly level when lifting it from the housing.

In another embodiment, the present invention is directed to a system of decorating an open container that includes a base having a depth and delimited at an outer periphery and a plurality of decorative elements that are at least one of irremovably disposed on and partially fixed within the base and a housing that includes at least one sidewall. A width and a depth of the base is less than or equal to a width and a depth of an inner surface area of the housing, and the inner surface area of the housing is entirely covered by the base.

The inner surface area of the housing can be entirely covered by two or more base portions that are contactable or adjacent to each other to form the decorative ornament assembly. The bases can be adjoined by abutting each other and can include magnets or engaging physical structures to align the bases relative to each other. The bases can also be connected together by a hinge or include a fastener or apparatus allowing the base portions to engage and form the decorative ornament assembly. When two or more base portions are used, the adjacent edges of the base portions and one or more decorative elements can be configured that when the bases are adjoined, the seam is obscured.

In a further embodiment, the housing can have a double side wall with an opening along one edge into which a flat insert can be slid. The insert can be substantially the same size as the side wall and have decorative elements printed or formed thereon. A decorative insert can be configured to match the design of a particular ornament assembly or can contain other desired images or text. Different pairs of ornament assembly plus thematically associated inserts can be provided to allow a user to quickly and easily change the overall design. In a further configuration, the size of the housing and space for the insert can be configured to receive a conventional flat panel display or tablet computer on which a variety of static and/or moving media can be displayed. A frame can be provided to hold the insert . . . . Position the insert, make it easier to put in and take out A kit can be provided that includes one or more premade decorative ornament assemblies and a housing. In one arrangement, a single assembly and housing are sized so that the base extends substantially about an interior space of the housing such that the base is contactable with the at least one sidewall of the housing. The user can swap out one ornament assembly for another from the kit as desired. For a large housing, the kit may contain two or more decorative ornament assemblies which are configured to be used together to cover the inner surface area of the bottom of the housing. The kit can further comprise packaging to contain and protect the housing and the ornament assembly and that is configured to allow these components to be safely shipped together as a kit and distributed to commercial outlets. In one configuration, the ornament assembly is pre-installed within the housing and the packaging arranged to allow the housing and ornament assembly to be viewed while still within the packaging. In a particular configuration, the packaging comprises a base to receive the housing, a lid to cover the housing, and a strap or other component, such as tape, to secure the base lid in place while leaving substantially all of the side walls of the housing unobscured. The kit can include multiple different ornament assemblies so the user can select and change them as desired.

The base can be made of at least one of gravel, sand, marbles, stones, rocks, plastic, paper, and a similar solidly formed substance, or a facsimiles thereof, or any other type of suitable base material which are bound together to form a solid structure.

The decorative elements can be at least one of plants, rocks, sunken ships, treasure chests, statues, signage, castles, and other decorative subject matter that appeals to consumers.

DETAILED DESCRIPTION OF EMBODIMENTS OF THE INVENTION

Figure 1A:
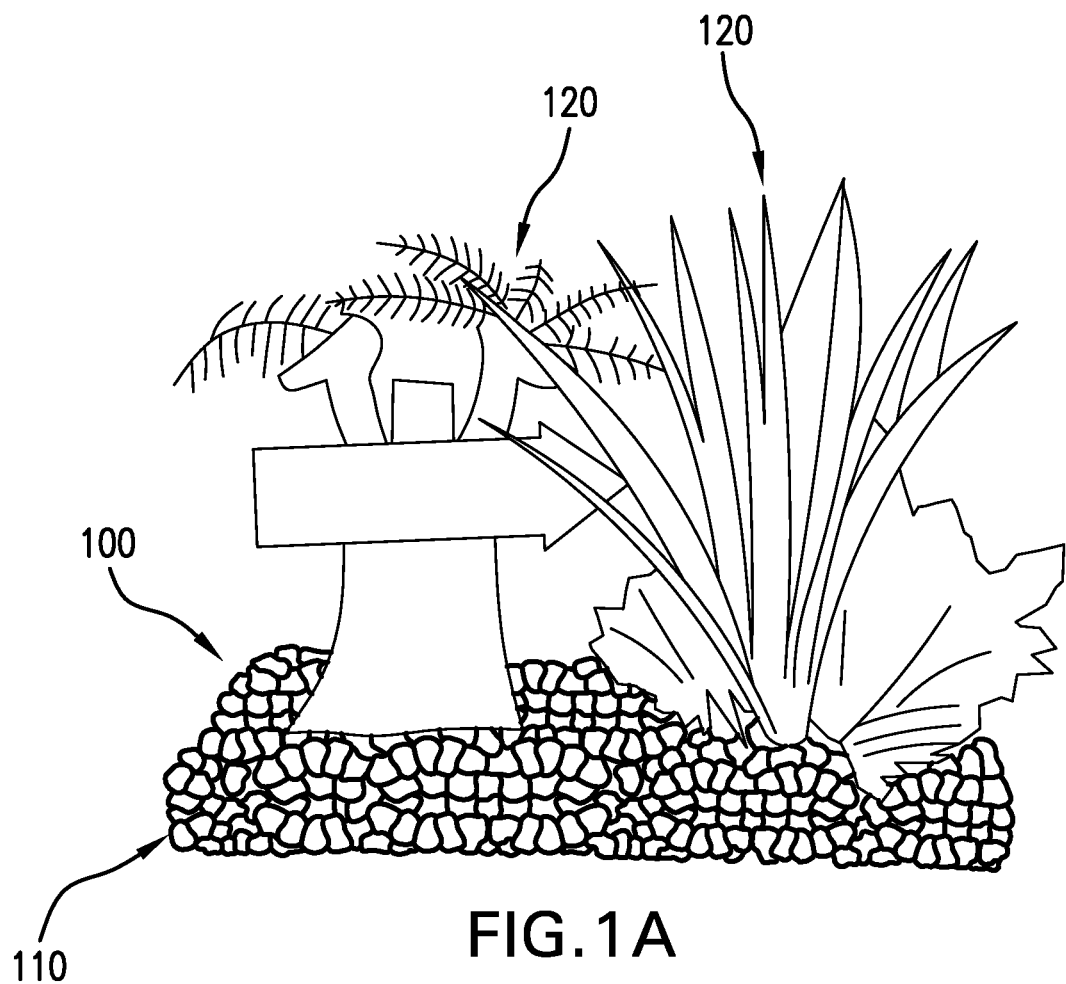
FIG. 1A is a front perspective view of a first embodiment of a decorative ornament assembly of the present invention.

Reference will now be made in detail to embodiments of the invention, examples of which are illustrated in the accompanying drawings. It is noted that the thicknesses of layers and regions in the drawings are exaggerated for clarity.

The decorative ornament assembly not only allows for an aesthetically pleasing appearance in a housing or on a surface, but also reduces the cost of purchasing several items to create such a decorative element, significantly reduces the time, expertise, imagination, creativity, and know-how required to create the desired decorative look. Otherwise, a user would need to select, acquire, and arrange the decorative elements on their own. The decorative ornament assembly also allows for easy removal from a container or from a surface to clean the container or surface and to clean or replace the decorative ornament assembly.

FIG. 1A is a front perspective view of a first embodiment of a decorative ornament assembly 100 of the present invention. The decorative ornament assembly 100 includes a base 110 that may have varying shapes, widths, depths, and heights depending on its intended use and stylization. The base 110 can be comprised of gravel, sand, marbles, stones, plastic, paper, and/or a similar substance or another material which are bound together using various methods and materials that are well known in the art, such as epoxy or resin bonding, glue, or use of any other adhesive material to form a solid structure and into which decorative elements 120 are irremovably disposed. The ornament assembly is manufactured as a pre-configured item so that it can be purchased in a ready-to-use form with minimal or no additional configuration needed.

The decorative elements 120 can include, for example, plants, statutes, signage, castles, sunken ships, treasure chests or other decorations are then irremovably disposed on or partially disposed in the base 110. As such, because the decorative elements 120 stand freely in conjunction with the base 110, they do not require repositioning or the aid of another structure to support the decorative elements 120 creating various environmental themes, such as an ocean, coral reefs, sunken cities, surfing, sailing, lighthouses on a cliff, forest, etc.

During manufacture of the decorative ornament assembly 100, the decorative elements 120 may be irremovably disposed on or partially in the base 110 by heating the base material, inserting the decorative elements 120 in or on the base material and then cooling the base 110 so the base material hardens and secures the decorative elements 120 therein or thereon. Alternatively, the decorative elements 120 may be inserted into, or attached to, the base 110 material, and then a resin, glue, or other adhesive material may be added to the base 110 so that it hardens into a single decorative ornament assembly. In a further configuration, the base and some decorative elements, such as coral shapes, buildings, or other solid elements, can be fabricated as an integral unit, such as through a resin molding or injection molding process. Other decorative elements may then be irremovably secured to the molded part separately from the molding process.

Figure 1B:
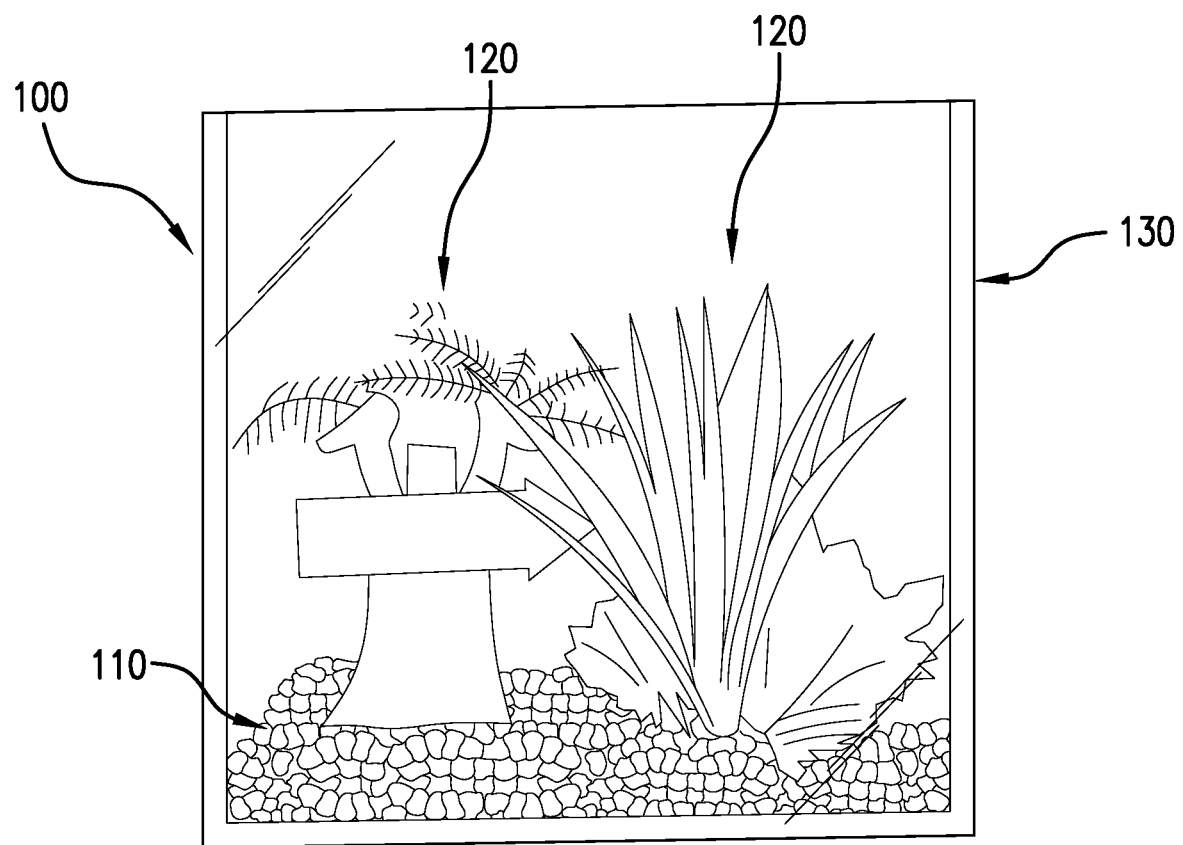
FIG. 1B is a front perspective view of the decorative ornament assembly of FIG. 1A arranged in a housing.

As shown in in FIG. 1B, the base 110 of the decorative ornament assembly 100 is configured and sized such that it encompasses substantially the entire surface area of a bottom wall within a housing 130, such as an aquarium, terrarium, or other form of a vivarium, thereby providing a customized and professionally decorative appearance. As a result, the pre-formed base appears to fill the bottom of the housing all the way to the edges and, depending on the design and composition of the base, gives a visual appearance of a housing with a substrate of loose gravel, sand, marbles, stones, or other generally flowable granular materials poured into it. Moreover, the decorative ornament assembly 100 can be selectively removed and replaced with an alternative decorative ornament assembly which is also sized to fit on and cover the entire inner bottom surface area of the housing 130.

The base 110 of the ornament assembly 100 has a predetermined width, depth, and height wherein these dimensions allow it to fit along or within the bottom inner surface area of a housing, such as a glass tank or container of other material. The ornament assembly 100 may be sized to fit inside standard sized housings such as aquariums (i.e. 2.5, 5, or 10 gallon tanks) or custom shaped tanks and/or other housings or containers comprised of various materials (e.g., glass, composite, plastic, etc.).

FIG. 1B is a front perspective view of a first embodiment of the present invention located in a housing (e.g., a glass container, a glass tank, vase, or a container of another material). As shown in FIG. 1B, the base 110 of the decorative ornament assembly 100 has a width and depth which conforms to the inner surface dimensions of the bottom of the housing 130. If this housing 130 is an aquarium, the user can then add water and fish to the container to complete the aquarium setup.

As the base 110 of the decorative ornament assembly 100 is affixed to the decorative elements 120, a user can simply remove the decorative ornament assembly 100 in its entirety from a housing 130 by grabbing either the base 110 or decorative elements 120. Removal of the entire decorative ornament assembly 100 from the housing in one step greatly simplifies the process of redecorating or cleaning a housing. For example, when the housing 130 is an aquarium, a user could easily clean the housing 130 by removing any contents thereof, such as fish/animals, removing the decorative ornament assembly 100, and then draining the water contained in the housing 130. The user would then be able to easily clean the entire decorative ornament assembly 100 and the housing 130 and then re-insert the cleaned decorative ornament assembly 100 into the housing 130 that has been cleaned or insert an alternative decorative ornament assembly into the housing 130.

In a preferred embodiment, at least one decorative element 120' that is affixed to the base is specifically configured and positioned so that a user can easily use that element to lift the ornament assembly 100 out of the housing 130 using a single hand. In a particular configuration, the decorative element is a rigid object that is large enough to be easily grabbed by a user's hand and shaped so that the user can get a secure grip on the decorative element 120' even if the element is very slippery due to accumulated growth of algae, bacterial slime, or coatings, a likely condition when the removal is being done because the assembly needs cleaning.

Figure 1C:
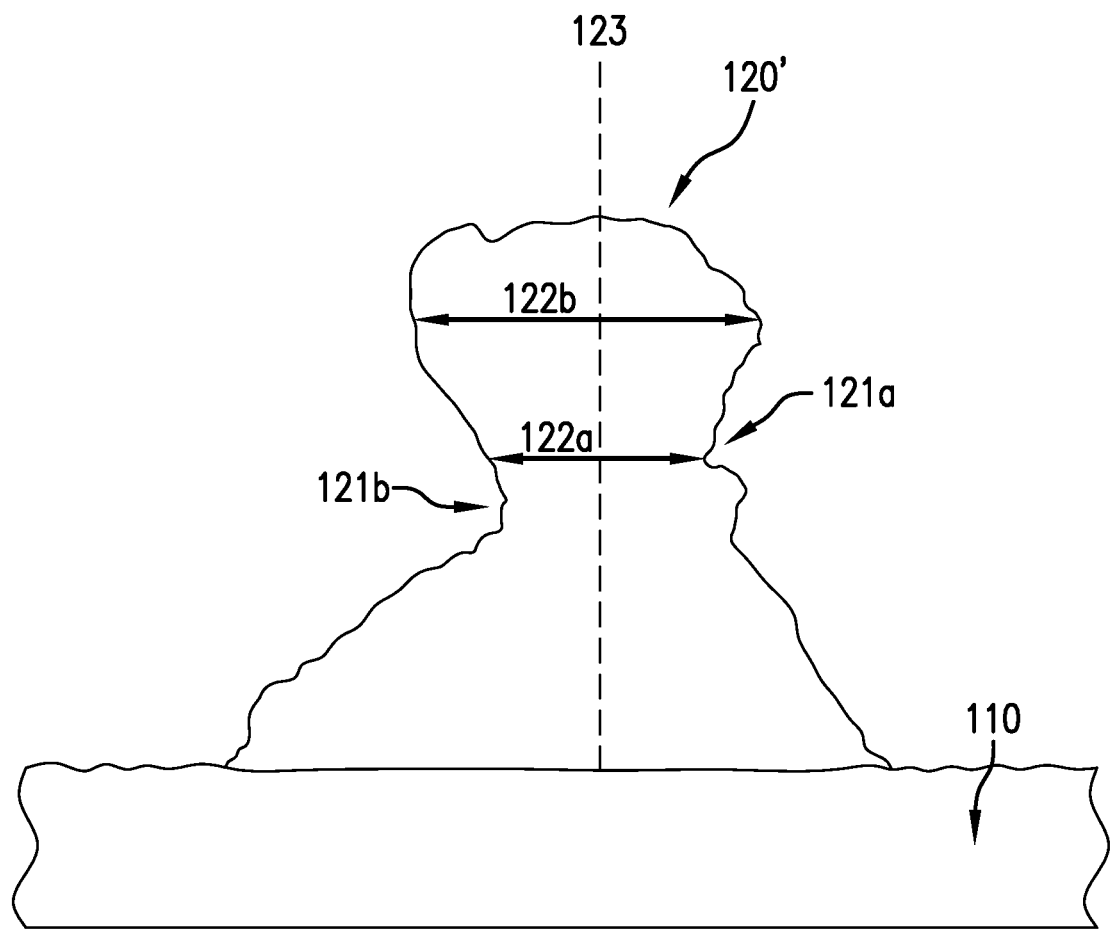
FIG. 1C is a diagram of part of a decorative ornament assembly showing a decorative element.

As shown in FIG. 1C, one arrangement of such as decorative element 120' has at least two indented areas 121a and 121b, which are each at least one-quarter and preferably at least one-half inch deep and positioned so that one indent area can receive one or more finger tips and the other receive a thumb as the user grasps the decorative element 120' with one hand. In a more specific configuration, the decorative element 120' has first and second cross-sections 122a, 122b at points along an axis 123 extending up from the base. The second cross section 122b is above and larger than the first cross section 122a creating an area on the decorative element 120 where the fingers of a person grabbing the element can find a secure purchase. Preferably the first cross section 122a is between ½ and 3 inches and the second cross section 122b extends at least ½ inch further than the first cross section 122a on generally opposite sides of the axis 123.

As will be appreciated, if the clearance between the base 110 of the ornament assembly 100 and the walls of the housing 130 is particularly tight and/or the base 110 particularly thick, tilting the ornament assembly as it is being inserted or removed may cause the edges of the base 110 to scrape and bind against the side walls of the housing 130. If the ornament assembly 100 gets stuck, the user may push down or pull up on the ornament assembly 100 to try and free it, potentially causing damage to the base 110 or the housing 130.

Figure 1D:
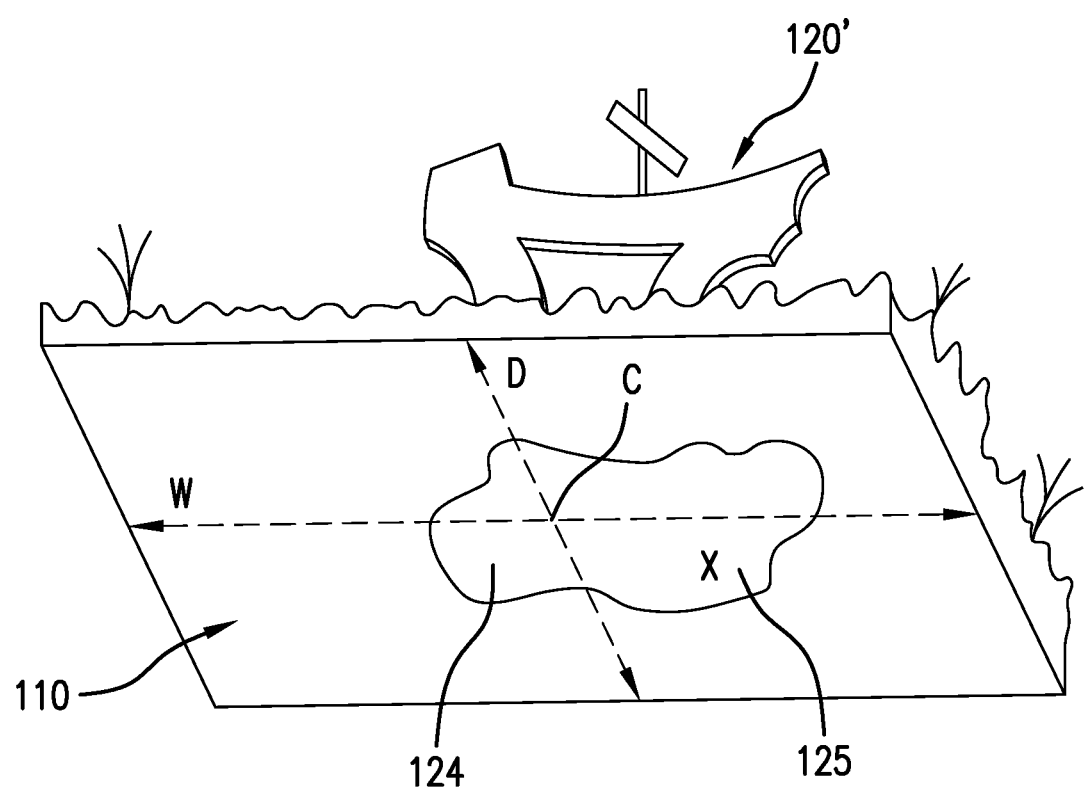
FIG. 1D is a bottom perspective view of a decorative ornament assembly.

According to a further aspect of the invention, and with reference to FIG. 1D, the decorative element 120' intended to be used for lifting the ornament assembly 100 is located away from the outer periphery of the base 110 towards the center of the base 110. The decorative element 120' can be positioned so that when the ornament assembly 100 is being held by the designated decorative element 120', the assembly is relatively balanced so that it can easily be held in a flat position using one hand. In one configuration, the decorative element 120' is positioned so that at least part of the profile 124 of the decorative element 120' projected downward onto the base 110 is more than one-quarter of the width W of the base 110 from each side edge and more than one-quarter of the depth D of the base 110 from the front and back edges, and preferably more than one-third or more preferably two-fifths the width W and depth D. In another configuration, the decorative element 120' is positioned so that its profile is over a center point C of the base 110, such as the point where diagonal lines drawn between opposing corners of the base cross. In a further configuration, the decorative element 120' is positioned so that its profile 124 is over a center of balance 125 of the ornament assembly. This configuration is particularly useful if the ornament assembly includes other decorative elements 120 that are heavy and arranged in an asymmetric manner.

Figure 1E:
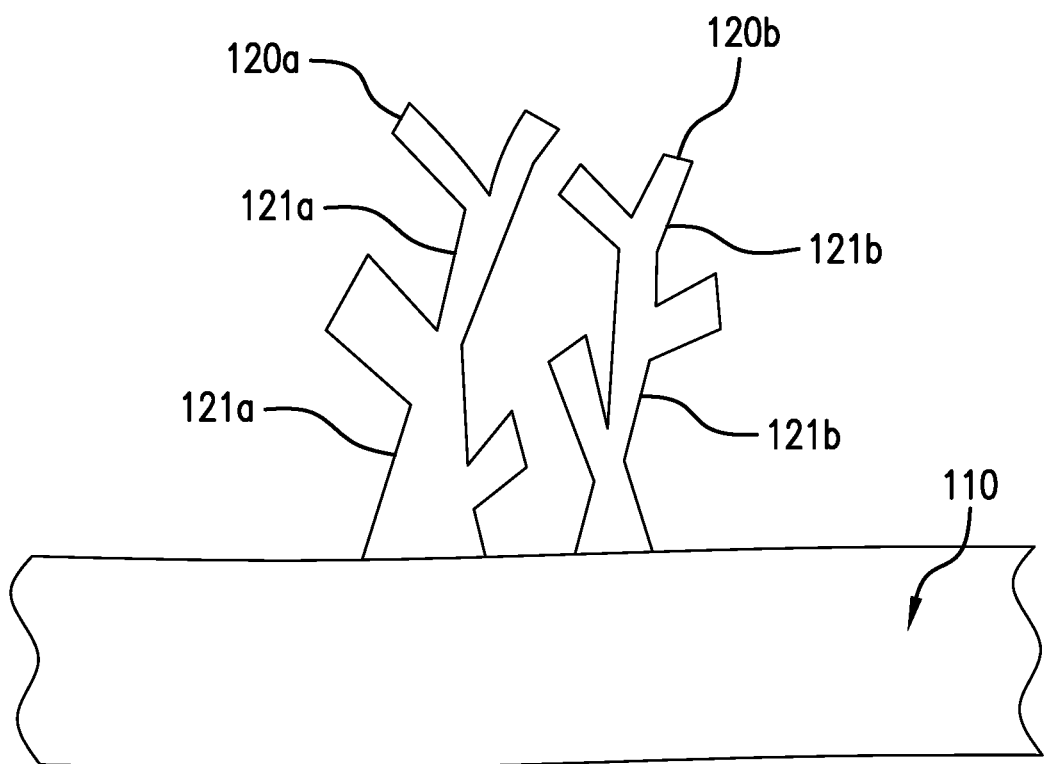
FIG. 1E is part of a decorative ornament assembly showing a pair of decorative elements.

While the decorative element 120' has been illustrated as a single element, such as a rock or a boat, in a particular configuration two or more decorative elements can be positioned near each other in the same area of the base and configured so that in combination they provide a gripping area that can be used to lift the ornament assembly out of the housing using a single hand in a manner similar to that for a single element. FIG. 1E, for example, illustrates a pair of decorative elements 120a, 120b configured as a branched tree or coral. Element 120a has indented areas 121a and element 120b has indented areas 121b. The indented areas are sized and positioned so that an indented area on one decorative element 120a, 120b can receive one or more finger tips and an indented area the other decorative element 120a, 120b receive a second finger tip, such as a thumb, as the user grasps the pair of elements with one hand.

On one embodiment, the base 110 is solid with no holes passing through it. Holes can act as a reservoir where bacteria, chemicals, and other residue harmful to fish may build up. Narrow holes can be difficult to clean and special cleaning tools can be required to do a thorough job. Also, when a user removes the ornament assembly 100 for cleaning, they may forget to clean out these holes, especially if the holes have filled with material and blend in to the rest of the base.

In instances where the housing 100 is an aquarium, inserting or removing the ornament assembly 100 is made more difficult when the aquarium is filled with water because of water resistance and the close fit of the base 110 against the side walls of the housing 130. In one configuration, the base 110 is sized so that there is sufficient gap between one or more edges of the base 110 and the adjacent walls of the housing 130 to permit enough water to flow past so that the ornament assembly 110 can be inserted or removed in only a seconds and yet where the gap is small enough so that it will not be apparent to a casual viewer when the base is installed. For example, the base 110 can be sized to provide a gap of less than one-quarter or more preferably less than ⅛ inch between each edge of the base 110 and the adjacent wall of the housing 130.

In addition or alternatively, the edges of the base 110 may be formed with one or more inlets or notches around the periphery to form channels which allow for increased water flow around the base 110 as it is lifted or inserted. If the base 110 is made of relatively large granular materials, such as pebbles or marbles, the base 110 can be configured so that even if its edges contact one or more walls of the housing 110, various natural looking gaps between the grains provide channels for water flow around the periphery of the base 110. For example, FIG. 2B (discussed further below) shows a base 210 made of relatively large gravel pieces that are contacting the walls of the housing 230 but which define various channels 240 between the wall of the housing and the edge of the base 210 through which fluid can flow.

In another embodiment, the base 110 of the decorative ornament assembly 100 can have one or more holes to allow for the insertion of a connecting a device for easier extraction of the decorative ornament assembly 100 from the housing 130. The hole can include a helical ridge or other fastening ridges, allowing a connecting device to fasten into the base 110. In addition, the hole can have a varying depth or extend through the base 110. In instances where the decorative ornament assembly 100 is used in an aquarium, a through hole in the base 110, instead of or in addition to notches along the edge of base 110, allows water to pass through the base 110, further minimizing resistance when removing the decorative ornament assembly 100 from a housing 130. Preferably, such holes are large enough to be easily cleaned by a user so that they do not serve as a place where contaminants may remain even after cleaning of the ornament assembly 100.

The base 110 can be of varying sizes or shapes, including rectangular, square, circular, or any other particular shape in order to fully cover the bottom inner surface of a housing of any shape.

Figure 2A:
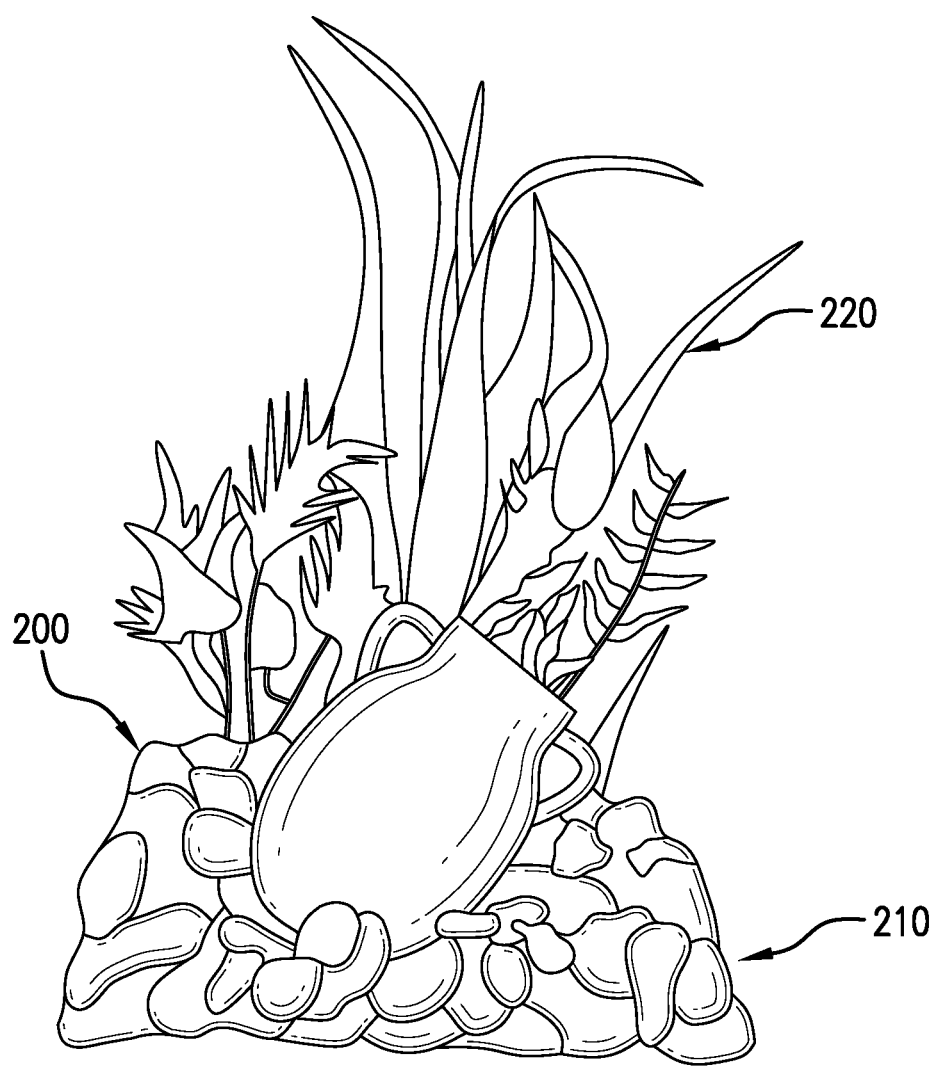
FIG. 2A is a front perspective view of a second embodiment of a decorative ornament assembly of the present invention.

FIG. 2A is a front perspective view of a second embodiment of a decorative ornament assembly 200. The decorative ornament assembly 200 includes a base 210 comprised of gravel and other materials and decorative elements 220 that are fixed to the base 210 and/or each other (e.g., by an adhesive or formed together). By combining the base 210 with decorative elements 220, the decorative ornament assembly 200 can act as a stand-alone decorative ornament or as a decorative centerpiece, such as those often found in restaurants, homes, bars, hotels, and other similar establishments. In such a case, a decorative ornament assembly 200 with various decorative elements 220 can be purchased and quickly and easily set into place without the need to purchase individual items or assemble the items to create a stand-alone decorative ornament or decorative centerpiece. The decorative ornament assembly 200 can be easily replaced, if and when needed, with an alternative decorative ornament assembly, for example, to reflect the different seasons of the year, holidays, occasions, sports, travel, or changes in personal taste in decor.

Figure 2B:
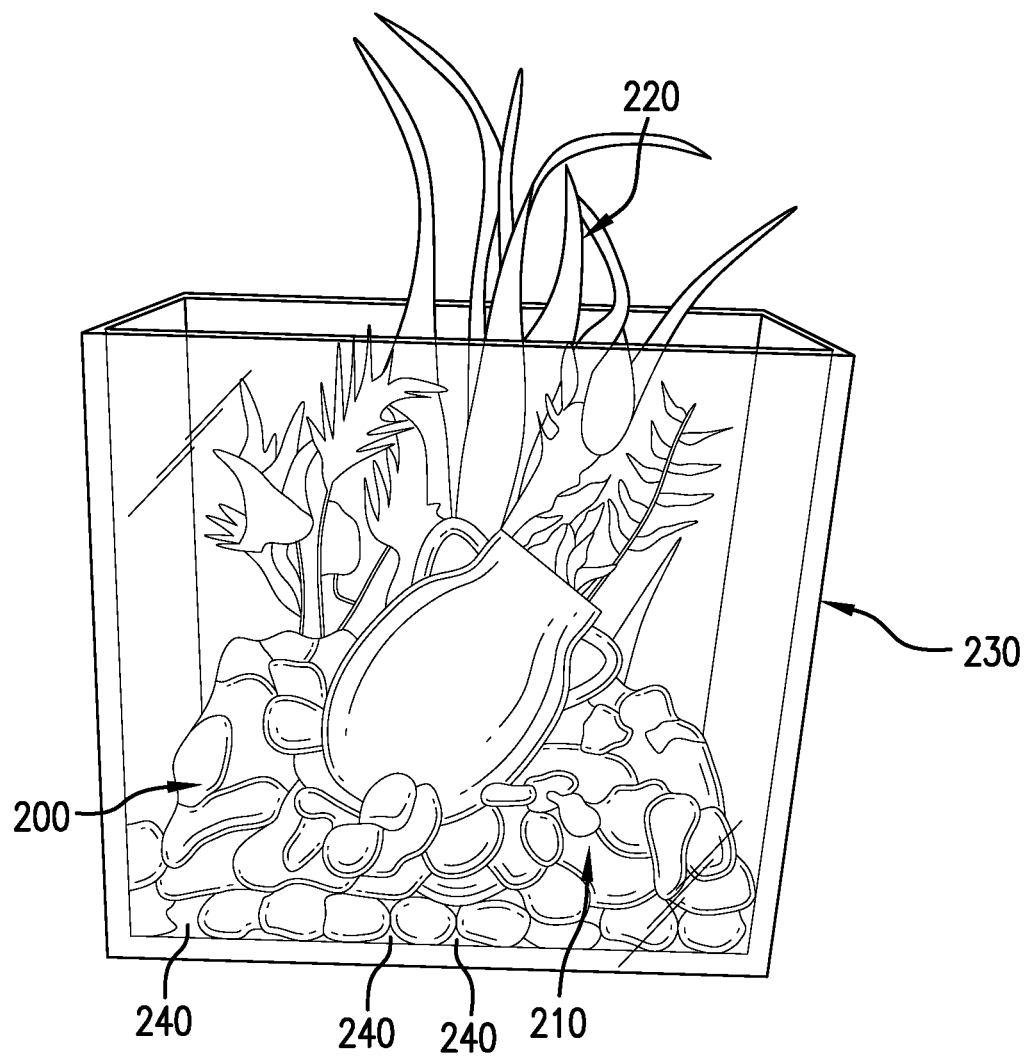
FIG. 2B is a front perspective view of the decorative ornament assembly of FIG. 1A arranged in a housing.

FIG. 2B depicts the decorative ornament assembly 200 arranged within a housing 230. The housing 230 has a square shaped bottom surface area, and the base 210 of the decorative ornament assembly 200 includes a base 210 that has a width and depth that completely encompasses the inner surface area of the bottom of the housing 230.

Although a square open housing 230 is shown in FIG. 2B, the decorative ornament assembly 200 can be arranged in a variety of housings, such as aquariums, terrariums, vases, or any other container. Regardless of the housing in which the decorative ornament assembly 200 is arranged, the user would again gain the benefit of being able to place a complete decorative ornament assembly 200 that includes the base 210 and decorative elements 220 into a housing as opposed to having to purchasing those decorative elements individually and arranging those elements in the housing.

Figure 3:
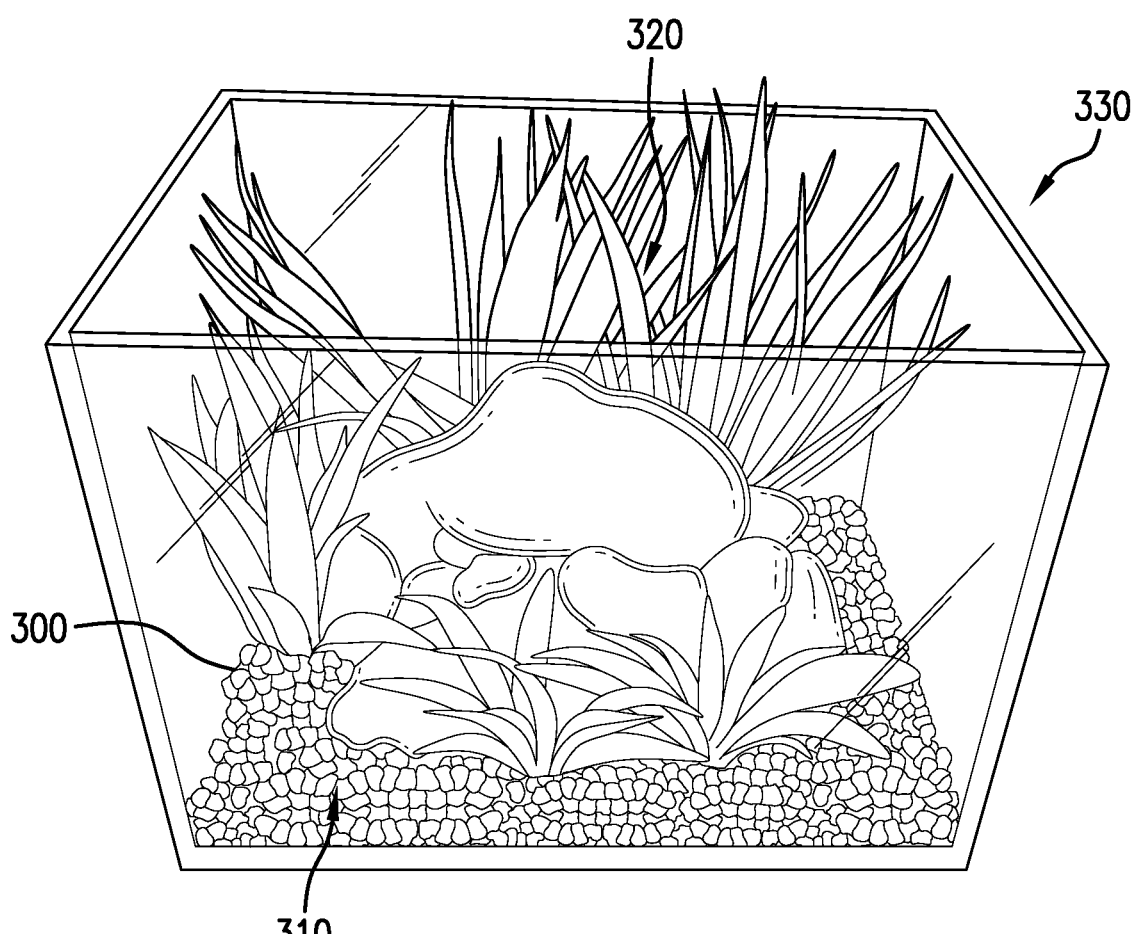
FIG. 3 is a front perspective view of a third embodiment of a decorative ornament assembly of the present invention located in a housing.

FIG. 3 is a front perspective view of a third embodiment of a decorative ornament assembly 300 located within a housing 330. The housing 330 is comprised of panels that can be comprised of, for example, glass, silicone glass, plastic, or another material. As shown, the housing 330 has a rectangular shaped bottom surface area, and the base 310 with the ornaments 320 of the decorative ornament assembly 300 is manufactured to substantially fit within the inner surface area of the housing 330.

Due to manufacturing and shipping limitations, along with concerns regarding weight of the decorative ornament assembly, the base of a decorative ornament assembly can only be so large. For example, a single decorative ornament assembly is not intended for use in large containers, such as a 50-gallon aquarium that has an inner width of 37 inches and a depth of 19 inches because the weight of the ornament assembly would make it difficult for a user to lift the assembly and/or place the assembly in such a container. If a single decorative ornament assembly that includes a base of about one inch in thickness and is made of polypropylene was used in conjunction with such a container, the base of the decorative ornament would have a volume of 703 cubic inches. Polypropylene has a weight of approximately 0.494 ounces per cubic inch. As such, in this example, the weight of the base alone, excluding additional weight provided by any decorative elements attached to the decorative ornament assembly, would be approximately 347 ounces, or nearly 22 pounds. If the base is made of a denser material, such as marbles or gravel, the weight would dramatically increase. Both the cumbersome size and weight of such a large decorative ornament assembly and corresponding base would obviate the benefits of the disclosed invention.

Figure 4A:
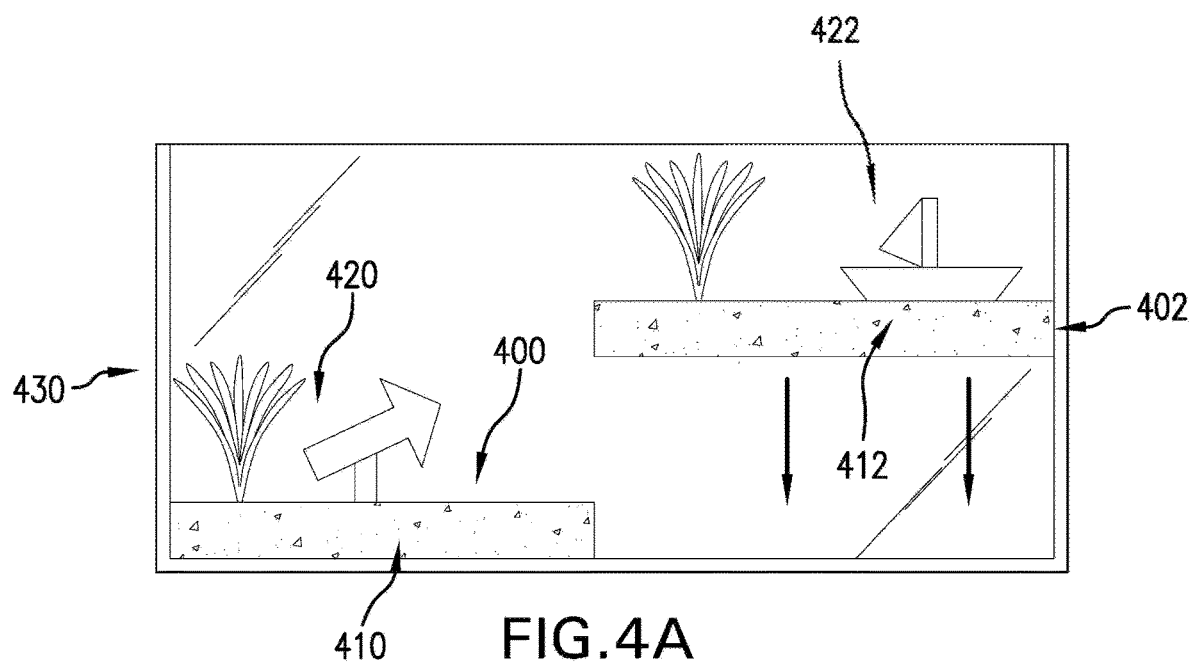
FIG. 4A is a front perspective view of a fourth embodiment of a decorative ornament assembly of the present invention.

In order to cover a large surface area without concern of having to lift a single heavy object and/or risk damaging a surface of a housing when arranging the object thereon, multiple decorative elements can be placed adjacent to each other, with a first part of the outer periphery of the base adjacent another base and a second part of the periphery adjacent the wall of the housing. As shown in an embodiment in FIG. 4A, a first decorative ornament assembly 400 and a second decorative ornament assembly 402 are arranged adjacent to each other in a housing 430. The first decorative ornament assembly 400 includes a base 410 and at least one decorative element 420. The base has a width that is less than width of the inner surface area of the housing 430, but is still manufactured to fit within the inner surface area of the housing 430. The second decorative ornament assembly 402, which is placed adjacent the first ornament assembly 400, includes a base 412 that has a width less than the width of the inner surface area of the housing 430 so as to also fit within the housing 430 and at least one decorative ornament assembly 422. The width and length of bases 410 and 412 conforms to the inner surface dimensions of the bottom of the housing 430 and are manufactured in a manner that, when placed contiguously, the bases 410 and 412 fully cover the inner bottom surface of the housing 430. Use of multiple decorative ornament assembly's to fully cover the inner surface area of the housing 430 will keep the weight of each decorative ornament assembly at a minimum. As with a single base, each ornament assembly section 400, 402 can have a decorative element configured as discussed above to allow the section to be easily and securely grasped and lifted by one hand. In a particular multi-base configuration, and as addressed further below, a decorative element on one base can be positioned to interact with a corresponding decorative element on a second base when the two bases are placed adjacent each other along their first outer periphery portions. In one version of this configuration, the interacting decorative element may be the one configured to be used to lift the respective base. It will be appreciated that in this embodiment, the decorative lifting element could be positioned away from the second outer periphery portion of the base but not necessarily away from the first outer periphery portion where the base abuts another base.

Figure 4B:
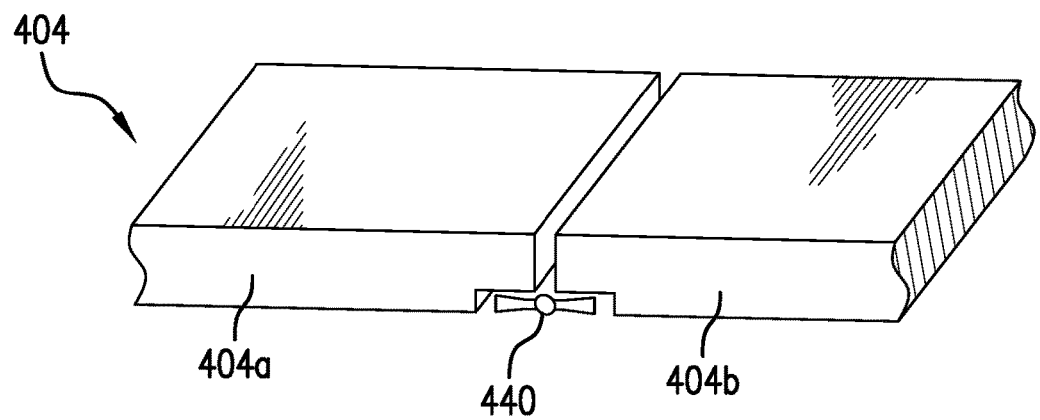
FIGS. 4B and 4C illustrate connection mechanisms for use in the fourth embodiment of a decorative ornament assembly.
Figure 4C:
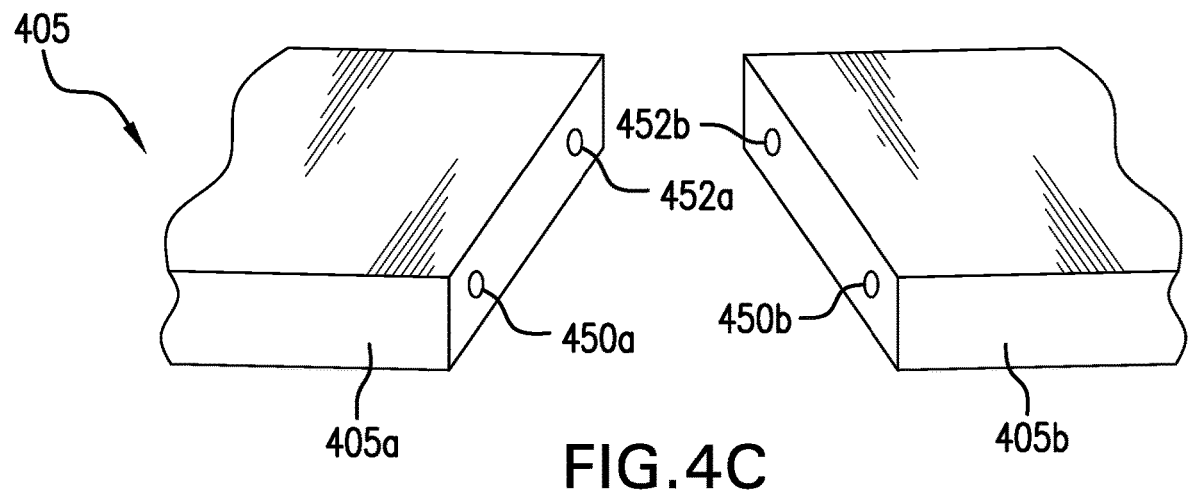

In some cases, there may be a need to ensure that in a decorative ornament assembly that comprises multiple bases, the bases remains adjacent to each other when arranged in a container. In such a case, the pieces can be fastened to each other by any known means including the use of adhesives, locking mechanisms, magnets, etc. or combined by a hinge system (e.g., living hinge, mechanical hinge system). FIG. 4B shows a portion of base 404 with parts 404a and 404b connected to each other by a mechanical hinge 440. FIG. 4C shows a portion of base 405 with parts 405a and 405b with fastening element 450a, 450b and 452a, 452b used to join the two parts together and help hold them in place relative to each other. The fastening elements 450a,b and 452a,b can be magnets or a combination of magnets and a ferrous metal. Alternatively they can be mating elements such as male pins bulges that interface with opposing holes or detents.

In particular configurations using two or more ornamental assemblies to cover the bottom of a housing, the ornamental assemblies are configured that when the bases are adjoined, the seam between the two parts is obscured or blended into the base or decorative elements on it. Various configurations are possible. In addition, although the adjacent base edges can be straight, the adjacent edges can also have undulating or irregular contours that mate against each other so that the seam is not a straight line and so may be less noticeable for this reason.

Figure 11A:
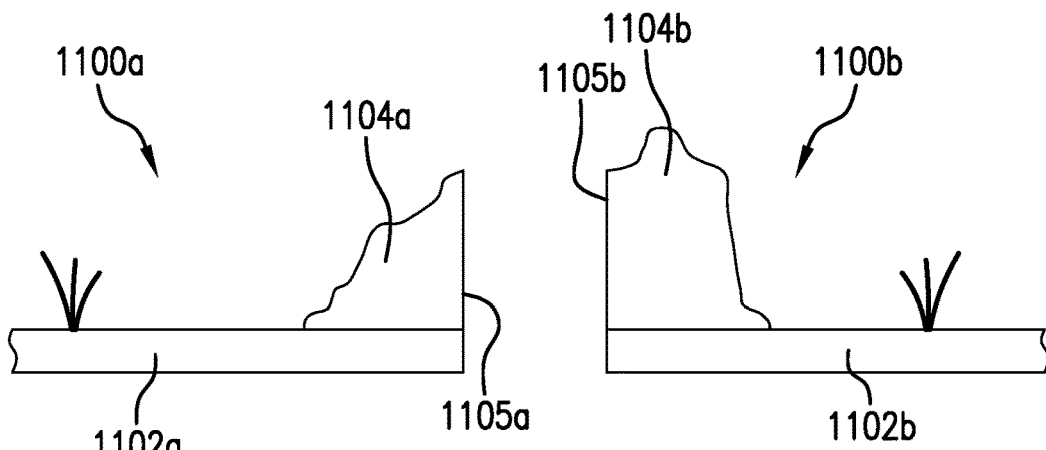
FIGS. 11A-11D and 12A-12D show various configurations of components the fourth embodiment of a decorative ornament assembly.
Figure 12A:
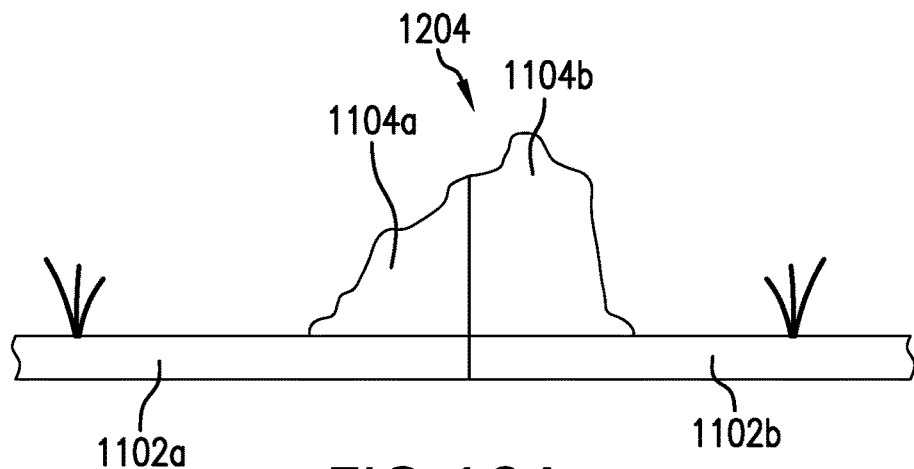

FIG. 11A shows a portion of ornament assemblies 1100a with base 1102a and decorative element 1104a and a portion of ornament assembly 1100b with base 1102b and decorative element 1104b. As shown in FIG. 12A, when the bases 1102a and 1102b are brought together, decorative elements 1104a and 1104b combine to give the appearance of a single larger decorative element 1204. In this configuration, the mating faces 1105a, 1105 of the decorative elements 1104a and 1104b have substantially the same shape. If the mating faces 1104a and 1104b are flat, each base element 1102a, 1102b could also be used individually in an appropriately sized housing and mating face 1004a, 1004b would rest flush against a wall of the housing.

Figure 11B:
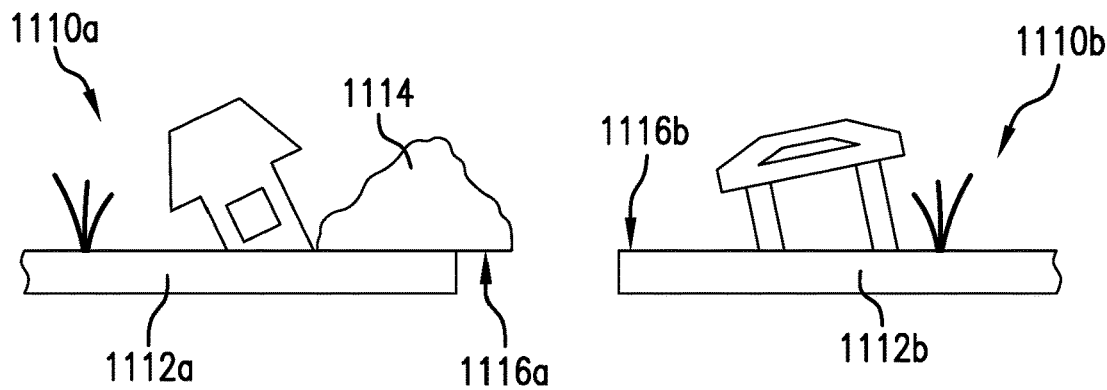
Figure 12B:
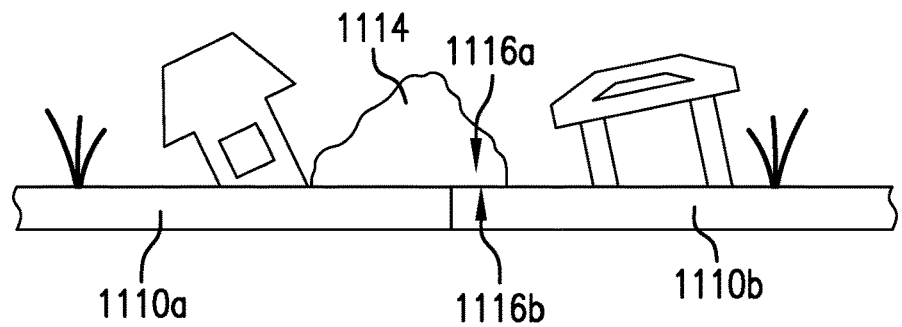

FIG. 11B shows a portion of ornament assemblies 1110a with base 1112a and decorative element 1114 and a portion of ornament assembly 1110b with base 1112b. Decorative element 1114 has a portion 1116a that extends past the edge of the base 1112a. As shown in FIG. 12B, when the bases 1112a and 1112b are brought together, decorative elements 1114 rests over region 1116b of base 1112b, obscuring the seam in that area.

Figure 11C:
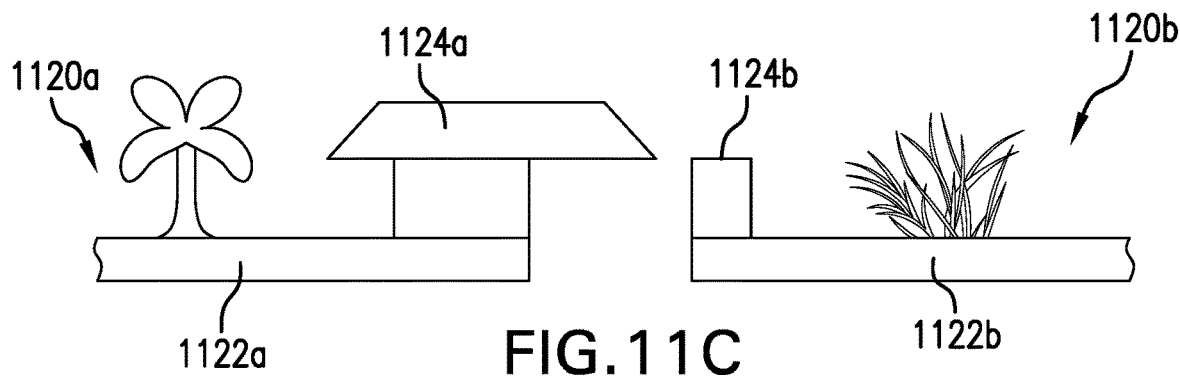
Figure 12C:
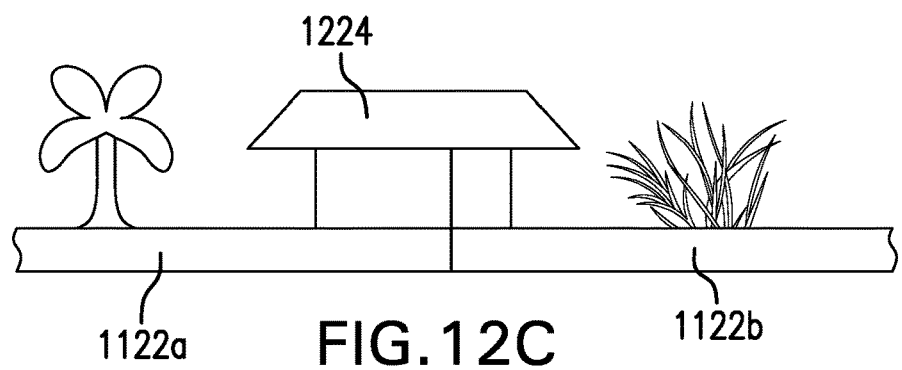

FIG. 11C shows a portion of ornament assemblies 1120a with base 1122a and decorative element 1124a and a portion of ornament assembly 1120b with base 1122b and decorative element 1124b. With reference to FIG. 12C, the decorative elements 1124a, 1124b are configured to engage with each other to give the appearance of a single larger decorative element 1224 when the bases 1122a and 1122b are brought together. In this example, elements 11224a and 1124b interact to give the appearance of a house-like structure.

Figure 11D:
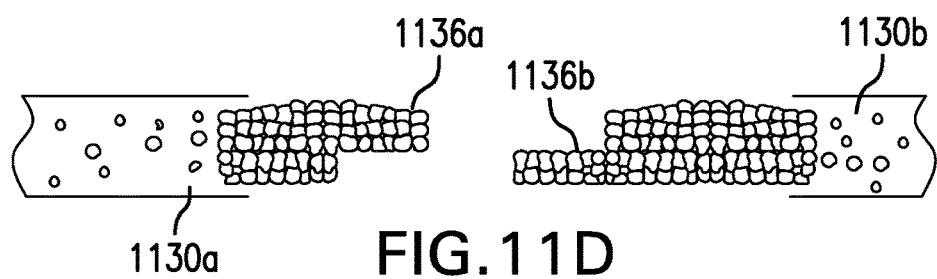
Figure 12D:
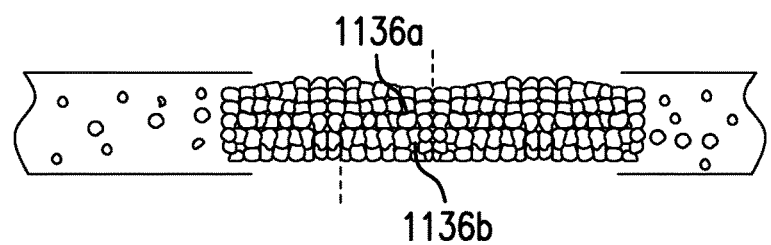

As will be appreciated, some or all of the area where adjacent ornament assemblies intersect may lack a decorative element. In such a case, the adjoining edges of the base can be configured to overlap and the overlapping parts designed to visually blend into each other. FIG. 11D shows part of a base portion 1130a and part of base portion 1130b. In this example the bases 1130a and 1130b are formed of gravel. Base 1130a has an overhanging portion 1136a which will fit over cheek 1136b on base 1130b. As shown in FIG. 12D, the gravel portions on the overlapping part is at least somewhat irregular and the two parts designed so that when the bases 1130a and 1130b are brought together, the area of intersection visually appears as a generally continuous surface.

As will be appreciated, in the configurations of FIGS. 11A-D and 12A-D, additional decorative elements (not shown) can be provided on each base portion as may be desired or appropriate, including a decorative element 120' configured to allow a user to grab and remove the ornamental assembly section using a single hand as may be needed. In addition, while the seam where the base parts intersect is illustrated as running from front to back of the container, the base portions can be configured so that the seam runs from side to side or even at an angle, such as diagonally between opposing corners. These positions may make the intersection area even harder to see.

In an embodiment, the decorations, including, but not limited to, ornaments and plants, can be releasably connected to the base so that the base and decorations can be shipped and/or packaged separately and various decorations can be replaced/interchanged to vary the décor as desired. This could possibly aid in packaging of the decorations in a further attempt to avoid damage to the decorations and reduce shipping fees.

For example, the base can include openings that can receive a connector from a plant (e.g., male-female connecting system), the base can include projections that extend into a receptor attached to the end of a plant, the base can include magnets that interact with decorations having magnets of an opposite polarity, dowels or the like can be used to connect decorations and the base or any other connection method that is known or may become known can be used to releasably attach decorations to the base.

The aforementioned advantages of the current invention also apply as will be described in further detail below, if the decorative ornament assembly of the present invention is used in connection with other containers, such as terrariums, globes, drums, or as a stand-alone decorative ornament, as opposed to with aquariums.

Figure 5A:
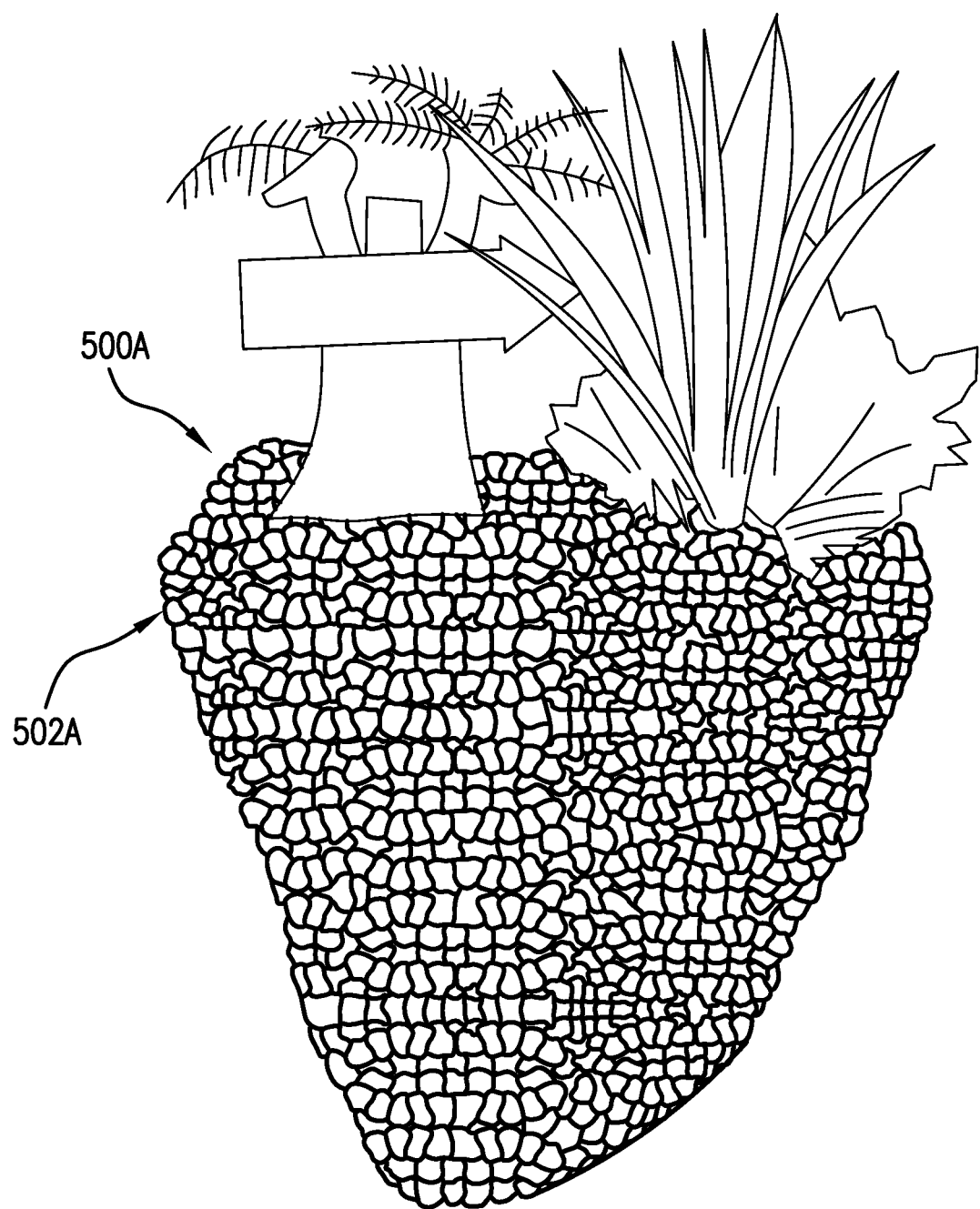
FIGS. 5A and 5B are a front perspective views of a fifth and sixth embodiment of a decorative ornament assembly of the present invention.
Figure 5B:
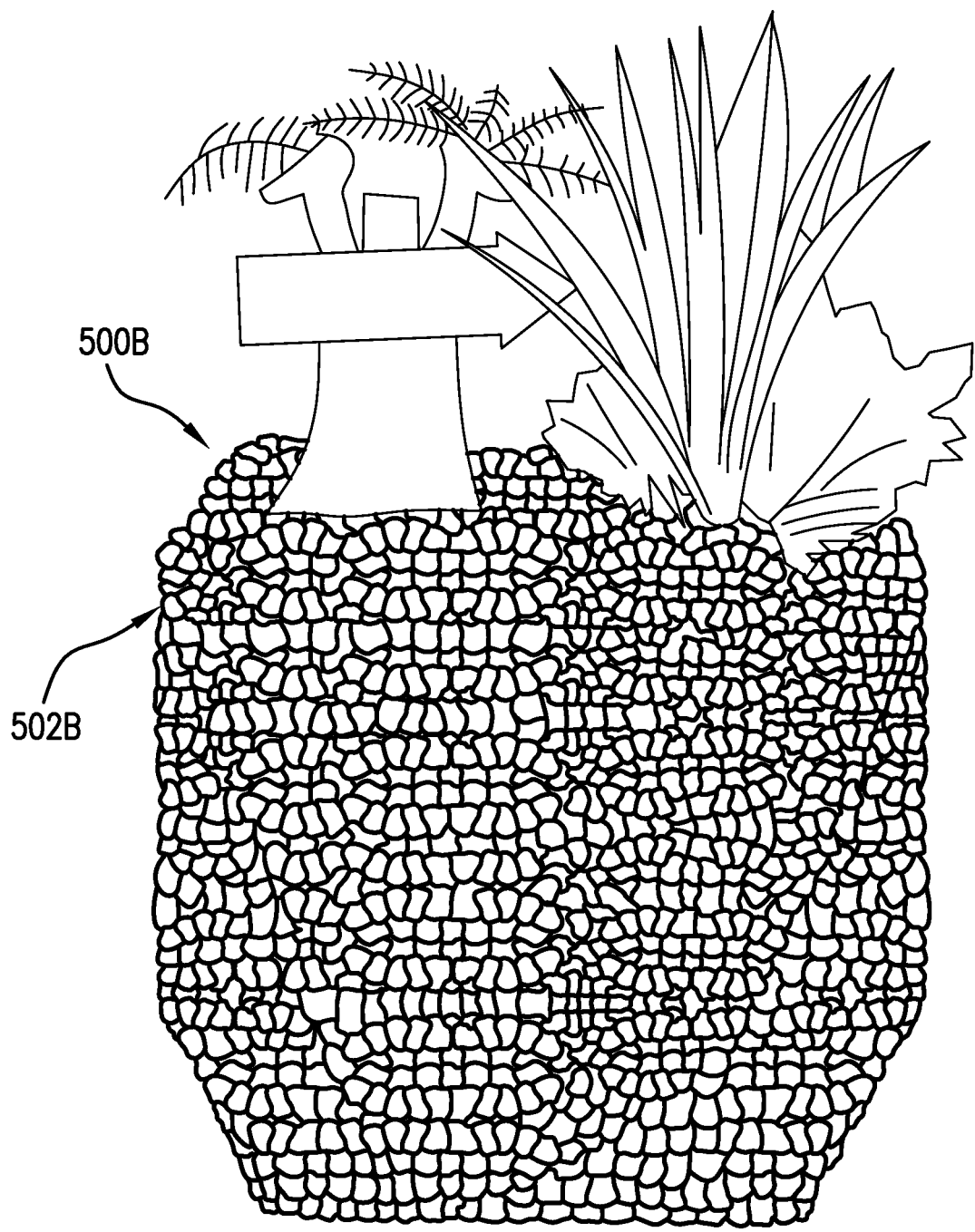

As shown in embodiments in FIG. 5A and FIG. 5B, a decorative ornament assembly, here indicated by reference numerals 500A and 500B, respectively, can include a base 502A, 502B, respectively, that has a depth that can be arranged in a housing that includes a contoured and/or curved sidewall. As such, the base 502A, 502B can substantially encompass an inner surface area of the housing without leaving a gap between the base 502A, 502B and the bottom portion of the housing or requiring gravel, sand, or the like to be placed beneath the base 502A, 502B as a filler, defeating the purpose of the one-piece ornament assembly.

Figure 6:
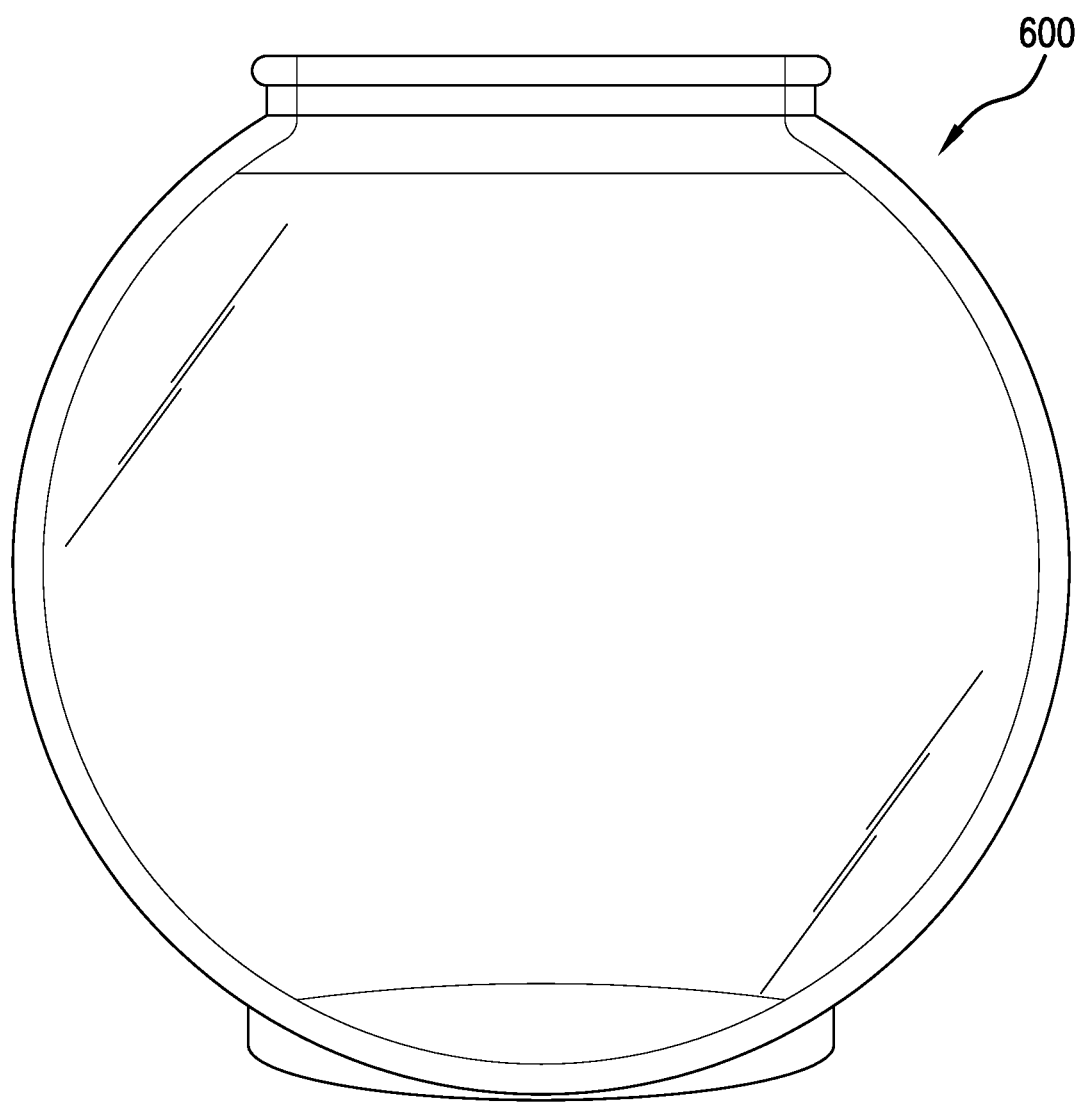
FIG. 6 is a perspective view of a known aquarium shape.
Figure 7:
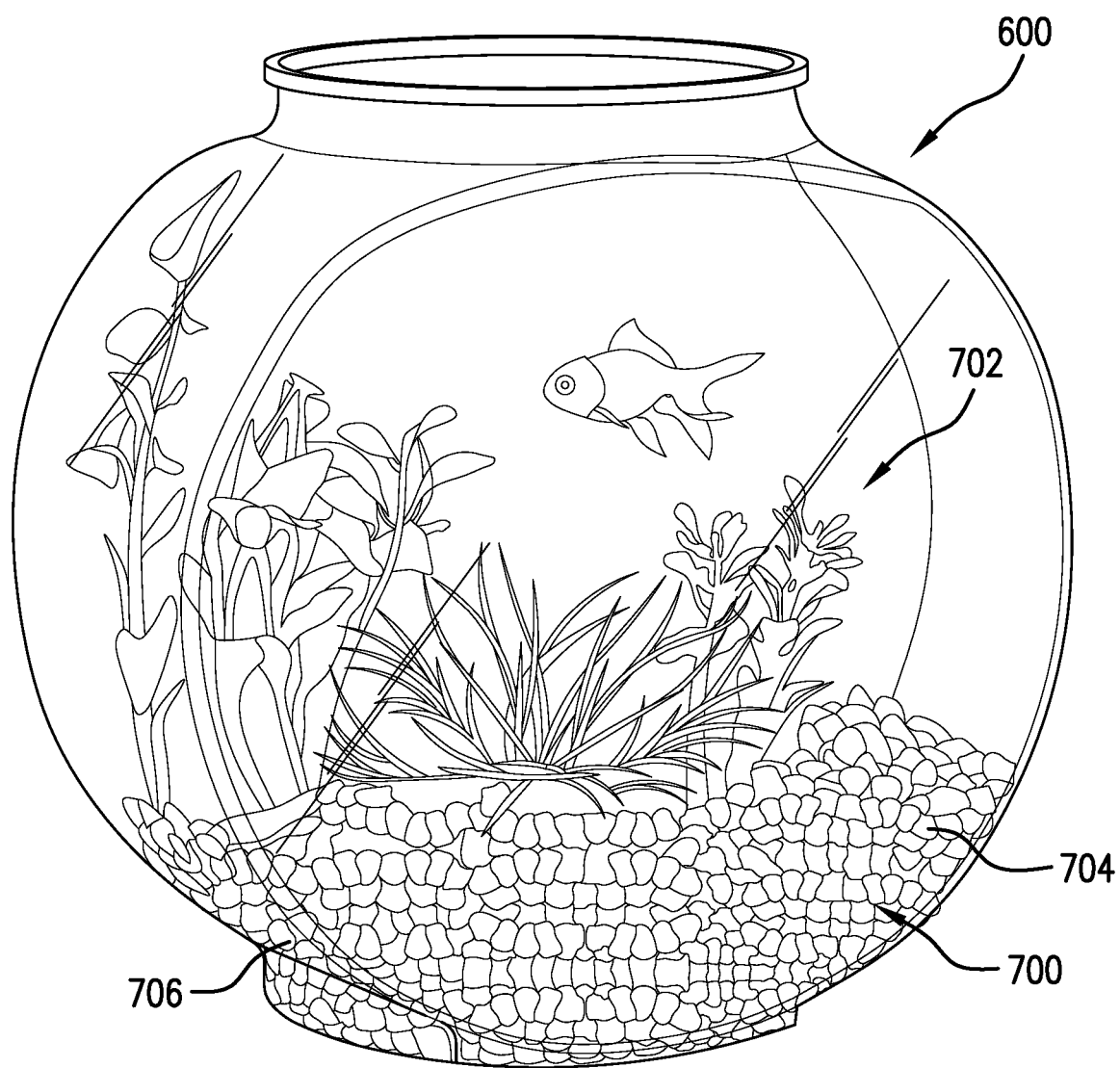
FIG. 7 is a perspective view showing a decorative ornament assembly arranged in the aquarium of FIG. 6.
Figure 8:
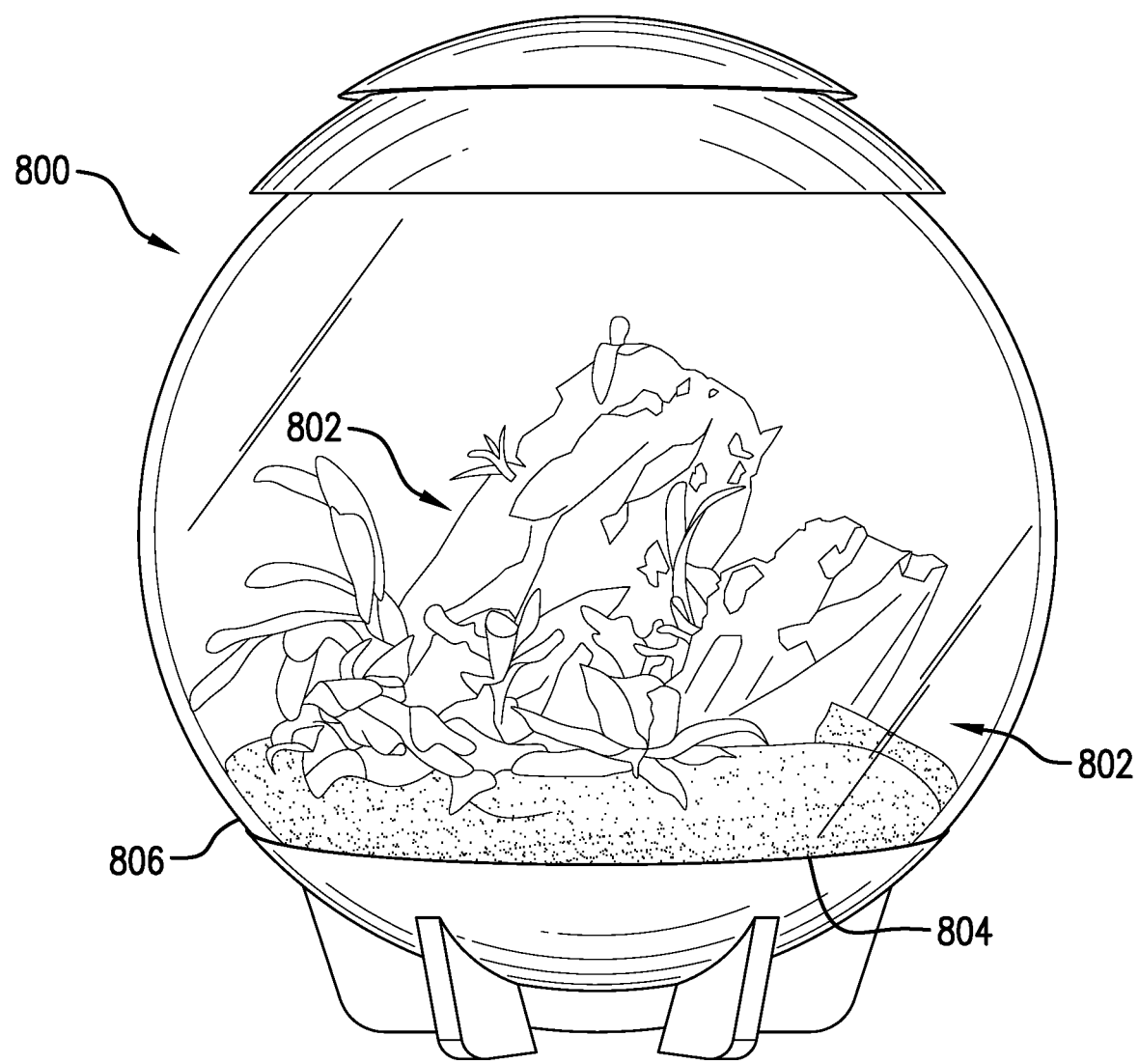
FIG. 8 is a perspective view of a seventh embodiment of a decorative ornament assembly arranged in a housing.

The decorative ornament assemblies of the present invention may have varying shapes, widths, depths, and heights depending on their intended use and stylization. For example, a base 704 of a decorative ornament assembly 700 as can be seen in FIG. 7 that is designed for use with a known housing 600 (see FIG. 6) can include sloping contoured sidewalls 706 such that the base 704 tapers toward a bottom portion of the housing 700. If traditional decorative elements were used in place of the decorative element 702 shown in FIG. 7, cleaning a housing such as the one shown in FIGS. 6 and 7 can be very time consuming and require extensive rearrangement and/or replacement of decorative elements FIG. 8 illustrates a perspective view of another known housing 800 in which a decorative ornament assembly 802 is arranged. As can be seen, the decorative ornament assembly 802 includes a base 804 with sloping sidewalls 806 that substantially contour to an interior space of the housing 800.

Figure 9:
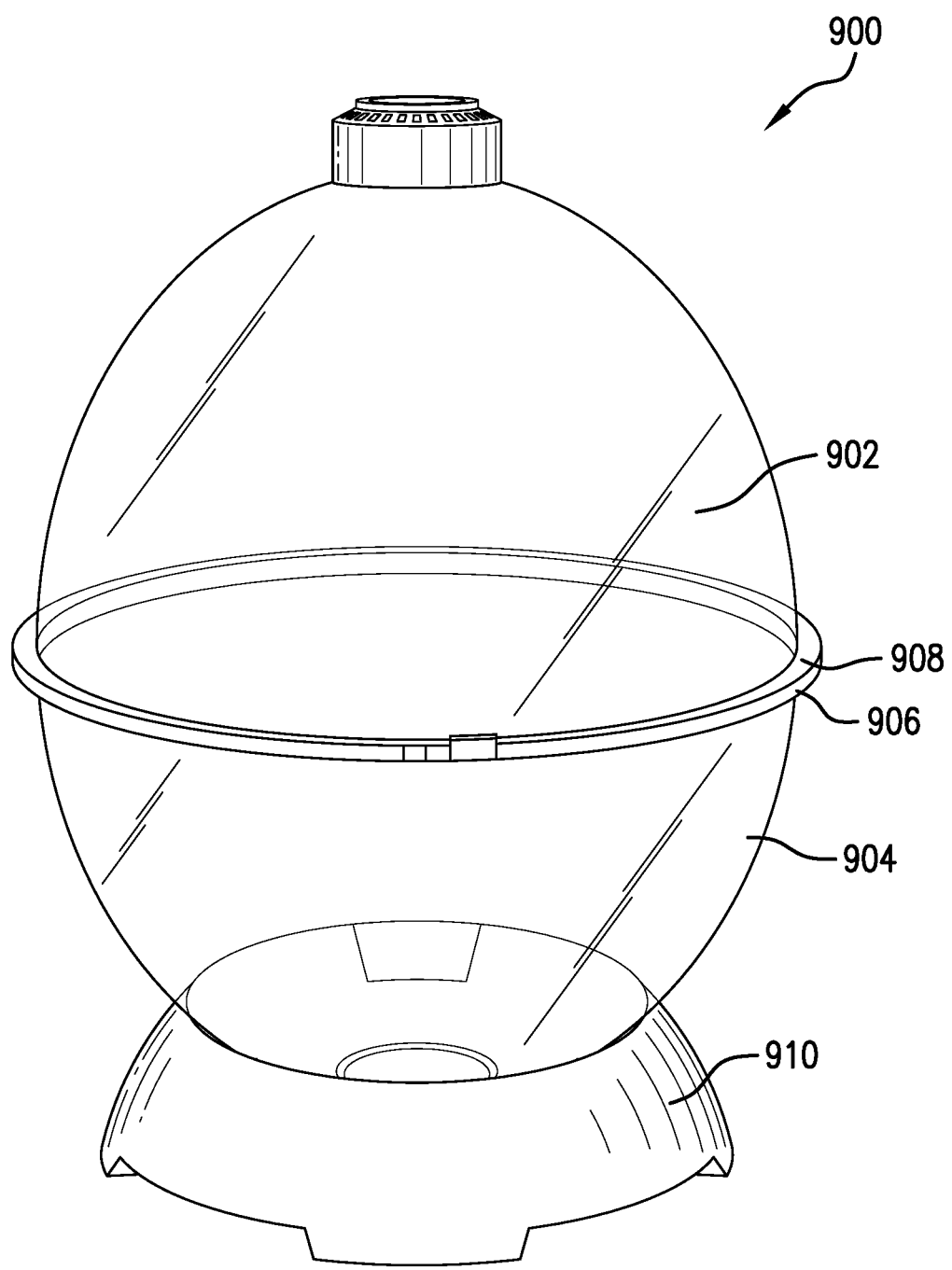
FIG. 9 is another known housing in which a decorative ornament assembly having a shape contoured to a portion of the inner surface area.

FIG. 9 illustrates another known housing 900 that includes a first semi-circular or dome shaped portion 902 that has a first rim 908 and a second semi-circular or dome shaped portion 904 that has a second rim 906 which is contactable with and seals within or around the first rim 904 of the first semi-circular or dome shaped portion 902. Although the container 900 is shown to rest on a base, the container 900 can be hung and/or not contain a base as well.

Figure 10:
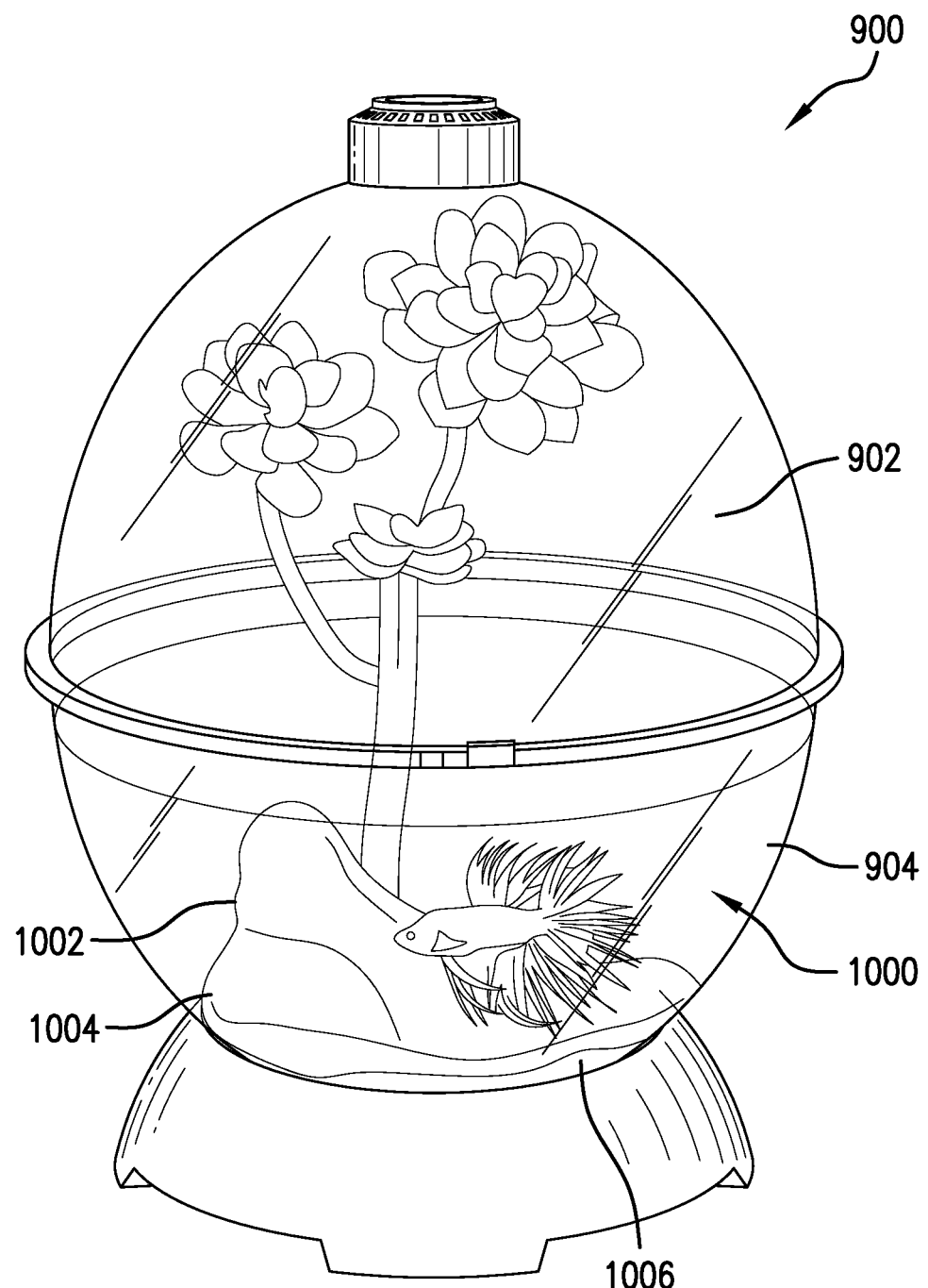
FIG. 10 is a perspective view of the housing of FIG. 9 showing an eighth embodiment of a decorative ornament assembly of the present invention arranged therein.

FIG. 10 depicts a decorative ornament assembly 1000 that is arranged in the housing 900 of FIG. 9. As shown, in order to substantially account for the interior space of the housing 900, the decorative ornament assembly 1000 has a base 1002 with sloping sidewalls 1004 and a substantially linear bottom wall 1006.

Figure 13A:
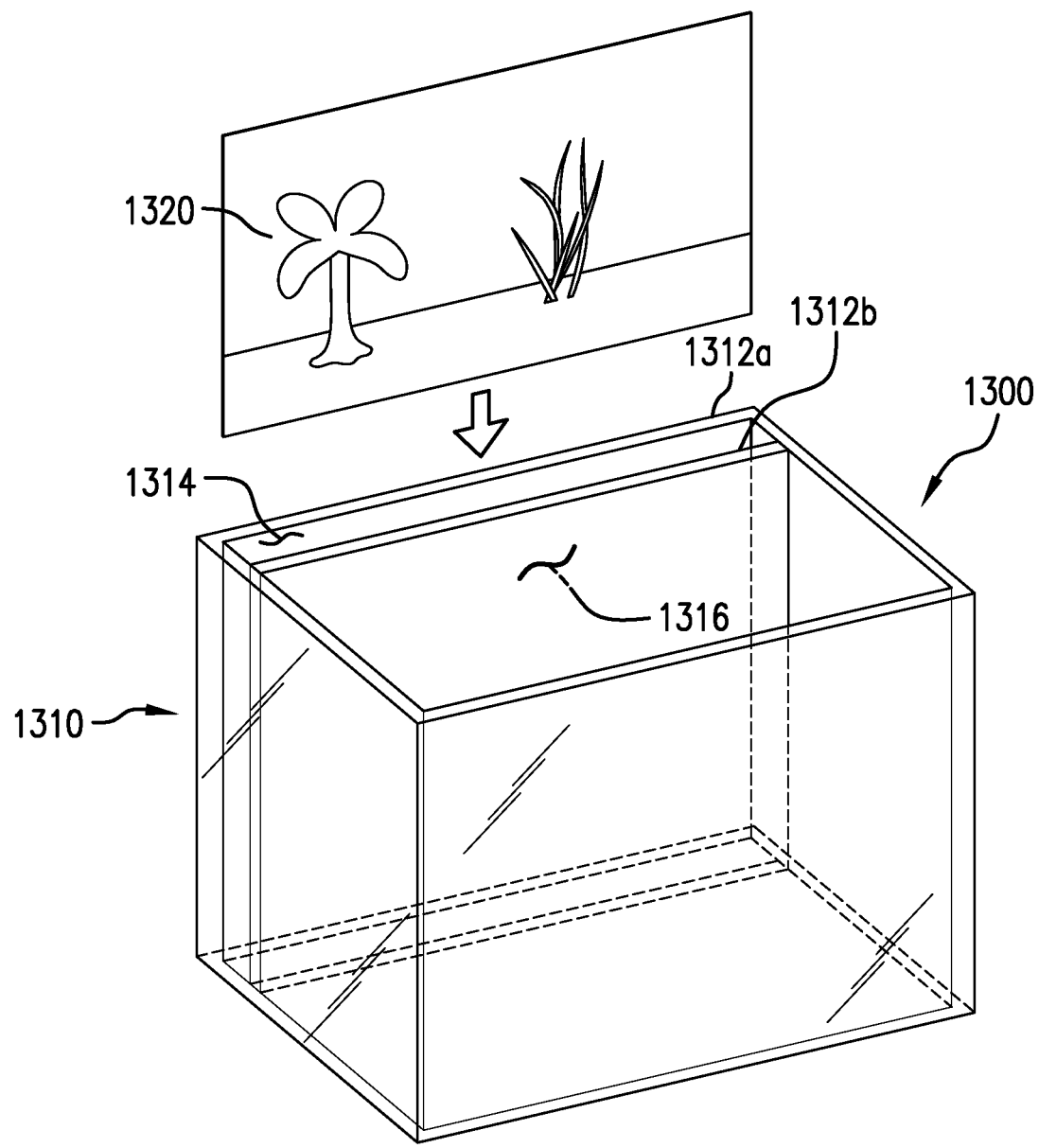
FIGS. 13A and 13B show a second embodiment of a housing for use with a decorative ornament assembly.

FIG. 13A shows a further configuration of a housing 1300. The housing 1300 is generally box shaped with four sides and a base and can be made of a transparent material. One side 1310 of the housing 1300 is formed with a double wall having a first wall 1312a and second wall 1312b spaced apart and parallel to the first wall 1312a. The top area between the walls 1312a and 1312b is open to define a narrow rectangular slot 1314 providing access to interior region 1316. Preferably, walls 1312a and 1312b are separated by a gap of between about 1/16 of an inch to two inches and more preferably between about one-quarter to one inch.

An insert 1320, substantially the same dimensions as side 1310 or smaller, can be slid into the region. The insert can be flat and made of paper, plastic, metal, or other sheet material. The insert 1320 functions as a backdrop to display in the housing 1300 and can have decorative indicia printed or formed thereon. The double wall 1312*a* and 1312*b* makes easy for a user to remove and replace one insert with another in order to quickly and easily change the look of the display in the housing 1300. A cover (not shown), such as an injection molded cap, can be provided to close the slot 1314 and keep water and other materials from getting in and possibly damaging the insert.

The insert 1320 can have a design that matches the design of a particular ornament assembly. Different sets of ornament assembly plus a thematically associated insert can be provided to allow a user to quickly and easily change the overall design within the housing. For example, a set of four pairs of an ornamental assembly plus insert can be provided, each having a theme for a given season (spring, summer, fall, winter). Other insert designs can be provided as well that may be independent of the design of any specific ornament assembly. For example, the insert can be a photograph of a person or couple to serve as a memento or commemorate an event. The insert can include an image of a ship, house, hotel, landscape, or anything else to look upon. In one configuration, the housing is sized so that the interior region 1316 is slightly larger than a standard printed photograph, such as 4×6, 5×7, or 8×10, 10×13, etc. For example, the width can exceed the photo size by ¼ inch to one inch.

Figure 13B:
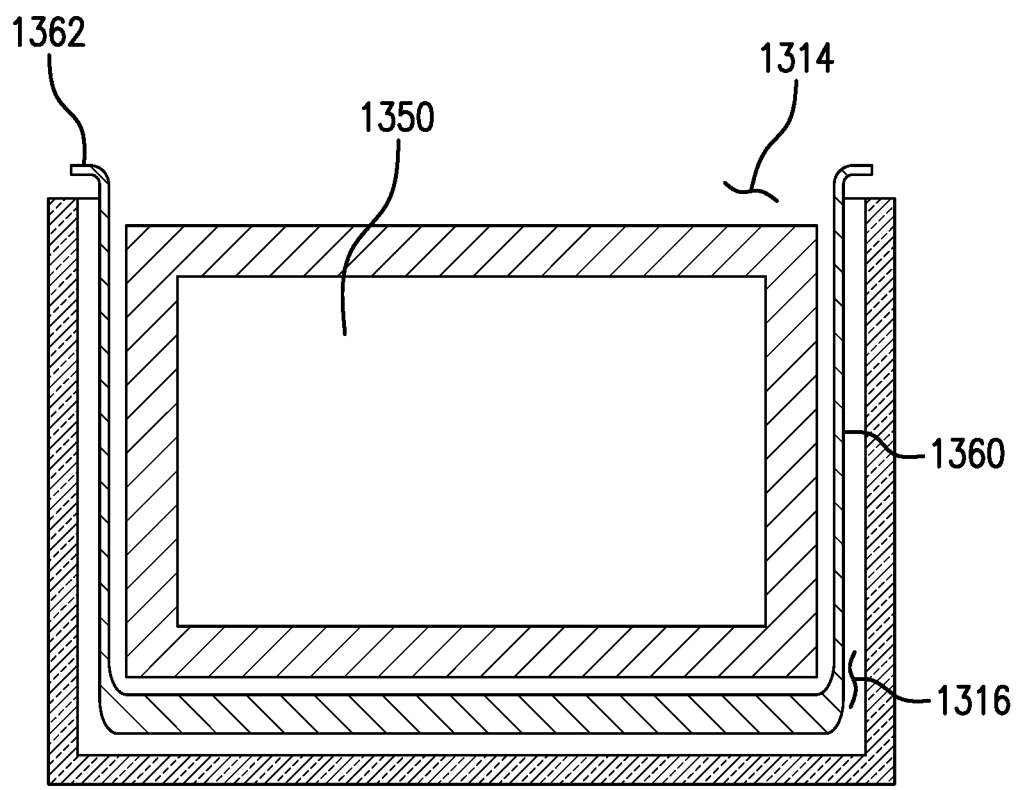

In a further configuration, the insert can be a conventional flat panel display, digital picture frame, or tablet computer 1350 on which a variety of static and/or moving media can be displayed. The size of the housing and space for the insert can be configured to accept devices of this type. FIG. 13B shows a cross-section of a housing, such as housing 1300 of FIG. 13A, between the double walls 1312*a*, 1312*b*. A tablet display 1350 is inserted through the slot 1314 and into the interior region 1316. To make it easier for a user to insert and remove the tablet display 1350, a U-shape frame 1360 can be provided. The frame 1360 is sized to fit within the interior region 1316 of the housing and to receive the tablet display 1350. In use, the tablet display 1350 is placed into the frame 1360 and the combined frame assembly lowered into the interior region 1316. Frame extensions 1362 can be provided which can hook onto the edge of housing to make it easier for a user to grab the frame. To remove the display, the frame is simply lifted up. The width of the sides and base of the frame can be configured to receive a specifically sized tablet computer and to position it within the housing. Different sized frames can be provided to adapt differently sized tablet computers to a given housing size.

A similar frame can be used to hold flexible non-rigid inserts, such as printed paper or photographs, to make it easier to insert and remove them and to frame the inserts within the housing if the housing size is larger than the insert. For example, a U-shaped frame can be sized to receive a 5×7 photograph (e.g. in a shallow slot formed along the inside of the frame) and position it centered within the interior region 1316 of a 6×8 inch container.

The frame can be a stand-alone component. Alternatively, it can be connectable to a cover or cap provided to close the slot 1314. For example, upper ends of the frame can have hooks that connect to rings formed on the bottom of the cap.

Figure 14:
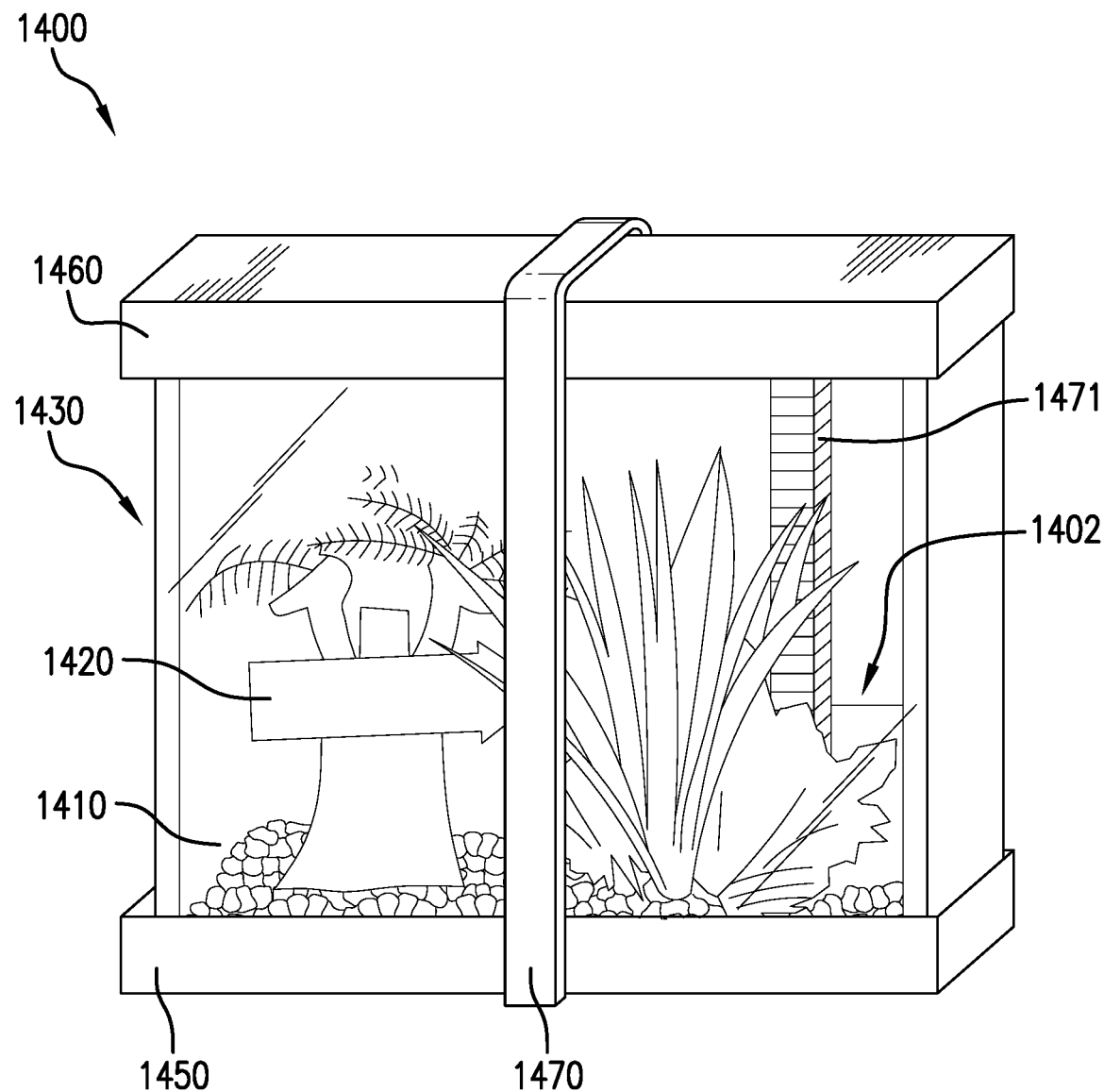
FIG. 14 shows a first embodiment of a decorative ornament assembly kit.

In a further embodiment, and with reference to FIG. 14, a kit 1400 is provided that comprises at least one decorative ornament assembly 1402 (having a base 1410 to which there is at least one decorative element 1420 irremovably disposed). The kit 1400 further includes at least one housing 1430. The decorative element 1402 and housing 1430 are sized so that when the ornament assembly 1402 is placed in the housing 1430 the base 1410 covers substantially all of the bottom of the housing 1430 as described above.

In one configuration, the kit is provided to a user with the ornament assembly 1402 pre-installed within the housing 1430 and the combined elements contained within a carrier or box. In a preferred embodiment, the carrier is configured to allow at least one side of the ornament assembly and preferably a majority of the housing with the ornament assembly therein to be seen while sill securing the parts of the kit. In the configuration of FIG. 12, the carrier comprises a base 1450 to receive the bottom of the housing 1430, a lid 1460 to cover the housing, and a strap 1470 or other component, such as tape, to secure the base 1450 and lid 1460 in place. One or more decorative inserts for a double-walled housing can also be provided as appropriate. One or more spacers 1471 can be included that span the space between an underside of the lid 1460 and a top surface of the base 1410 in order to secure the decorative assembly 1402 in place within the housing 1430. Spacers 1471 can be made of cardboard, plastic, or other generally rigid material.

The kit can include multiple different ornament assemblies. The user can then easily remove one from the housing and replace it with another.

Figure 15:
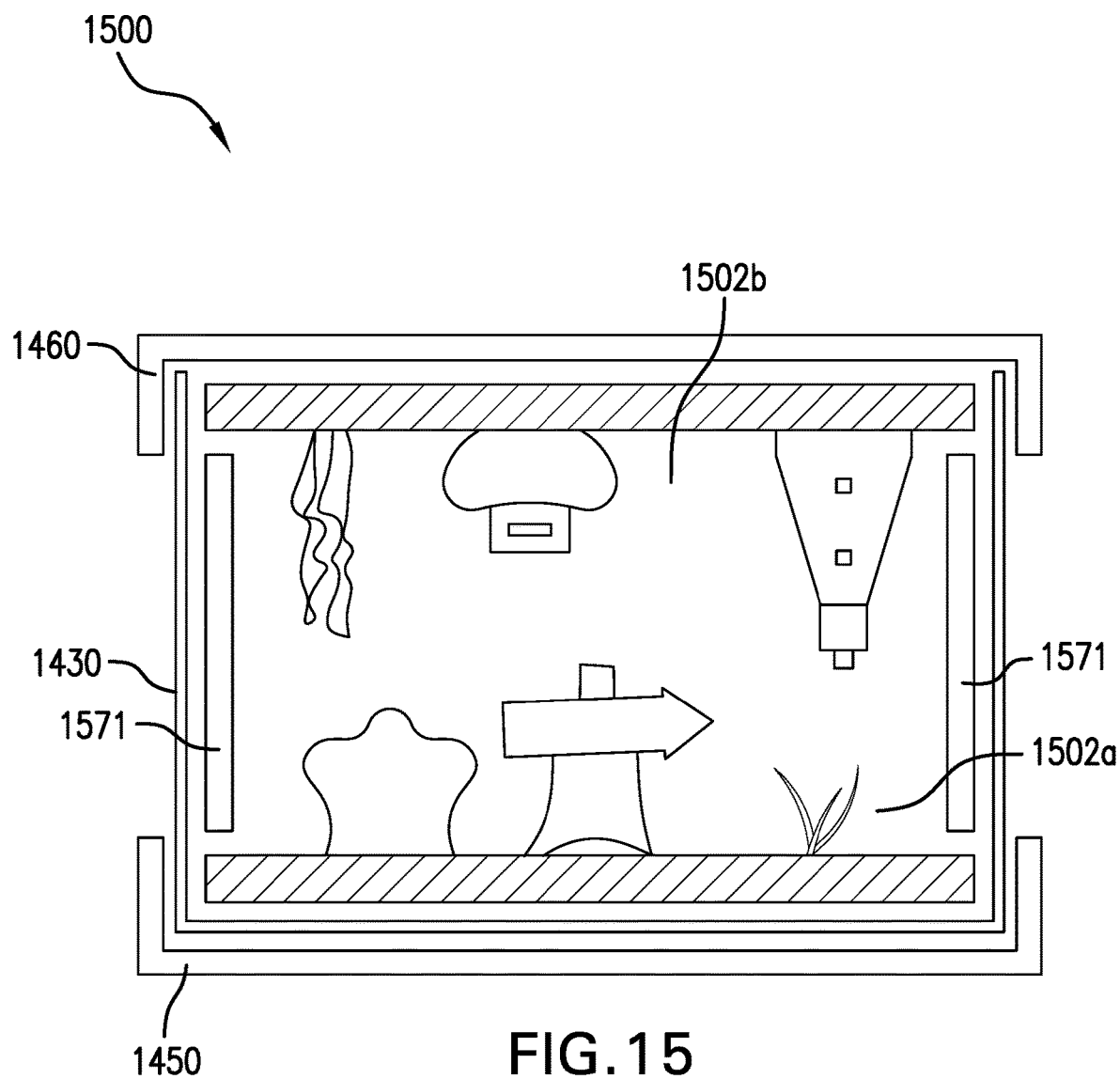
FIG. 15 shows a second embodiment of a decorative ornament assembly kit.

In one further configuration, and with reference to FIG. 15, a kit 1500 can include a housing 1430 and two ornament or more ornament assemblies, such as ornament assemblies 1502*a* and 1502*b*. The plural ornament assemblies can be inserted into the housing 1430 and kept apart from each other with one or more spacers 1571. In one arrangement, one ornamental assembly 1502*a* is placed in the bottom of the housing 1430. A second ornamental assembly 1502*b* is positioned in the housing at the top but oriented upside-down. Spacers 1571 keep the two ornamental assemblies 1502*a*, 1502*b* separate from each other. Using a carrier having base 1450 and lid 1460 as discussed with respect to FIG. 14 secures the two ornamental assemblies in place and allows them both to be viewed while the kit is within the carrier.

The base of all embodiments can be comprised of gravel, sand, marbles, stones, plastic, paper, and/or a similar substance or another material which are bound together using various methods and materials that are well known in the art, such as epoxy or resin bonding, glue, or use of any other adhesive material to form a solid structure and into which decorative elements are irremovably disposed. The decorative elements for all embodiments can include, for example, plants, statutes, signage, castles, sunken ships, treasure chests or other decorations are then irremovably disposed on or partially disposed in the base. As such, because the decorative elements stand freely in conjunction with the base, they do not require repositioning or the aid of another structure to support the decorative elements creating various environmental themes, such as an ocean, coral reefs, sunken cities, surfing, sailing, lighthouses on a cliff, forest, etc.

Although embodiments of decorative ornament assemblies are shown herein to include substantially linear bases, bases with sloping or conical sidewall, etc., the decorative ornament assemblies of the present invention can include a base having any configuration, including bases with varying depths and shapes to be arranged in a variety of housings, such as aquariums, terrariums, vases, or any other container.

Although the description above and figures contains much specificity, the details provided should not be construed as limiting the scope of the embodiments, but merely as describing some of the features of the embodiments. The description and figures should not to be taken as restrictive and are understood as broad and general teachings in accordance with the present invention. While the embodiments have been described using specific terms, such description is for illustrative purposes only, and it is to be understood that modifications and variations to such embodiments, including, but not limited to, the substitutions of equivalent features and terminology may be readily apparent to those of skill in the art based upon this disclosure without departing from the spirit and scope of the invention.

What is claimed is:

1. A decorative system comprising:
a housing including a bottom surrounded by at least one sidewall and having a bottom inner surface area defined by the intersection of the at least one sidewall with the bottom;
a plurality of preconfigured decorative ornament assemblies for placement in and selective removal from the housing, each preconfigured decorative ornament assembly including a solid base having a bottom, a top, and first and second outer periphery portions and one or more decorative elements fixed to and extending upward from the top of the solid base;
the decorative elements and solid bases of the preconfigured decorative ornament assemblies are arranged adjacent to each other at respective first outer periphery portions forming a visually decorative unit having a continuous environmental theme; the solid bases in combination are substantially the same size and shape as that of the bottom wall inner surface area of the housing;
one or more of said decorative elements on each of the plurality of the preconfigured decorative ornament assemblies being a decorative lifting element, each decorative lifting element being permanently and directly affixed to the base at a location away from the outer periphery of the respective solid base towards or at a center region of the respective solid base, and extending upwards from the solid base a distance greater than a thickness of the solid base; the one or more decorative lifting elements configured to be securely grasped by a user with a single hand, wherein the plurality of assemblies are easily lifted and removed from the housing by means of the single hand grasping the decorative lifting element of said one or more decorative elements of each of the preconfigured decorative ornament assemblies; wherein the plurality of preconfigured decorative ornament assemblies are within the housing;
means which obscure a seam or seams between adjacent preconfigured decorative ornament assemblies; and
a second decorative element on a second preconfigured decorative ornament assembly, the second decorative element positioned and configured to mate with the first decorative element upon joining of the first and second decorative elements, and the mated first and second decorative elements forming a combined decorative element.

2. The system of claim 1, wherein the one or more of the plurality of decorative lifting elements extend upwards from the solid base at least a distance greater than twice the thickness of the solid base.

3. The system of claim 1, further comprising the housing having an opening at the top that is the same size and shape as the bottom inner surface of the housing; wherein the preconfigured decorative ornament assemblies are removable from the housing without tilting of the at least one preconfigured decorative ornament assembly.

4. The system of claim 1, further comprising the seam is side edges of adjacent preconfigured decorative ornament assemblies being mechanically or magnetically connected in a manner which obscures the seam.

5. The system of claim 1, further comprising the seam is abutting side edges of adjacent preconfigured decorative ornament assemblies, which obscures the seam.

6. The system of claim 1, further comprising the seam is a transverse diagonal side edge of a preconfigured decorative ornament assemblies mating with a transverse diagonal side edge of an adjacent preconfigured decorative ornament assembly, which obscures the seam.

7. The system of claim 1, further including holes in the solid base of one or more preconfigured decorative ornament assemblies to permit water to flow therethrough; wherein the holes are large enough to be easily cleaned, to prevent contaminants from remaining after cleaning.

8. The system of claim 1, wherein the holes in the solid bases of the preconfigured decorative ornament assemblies have fastening ridges, to which the connecting device fastens to the solid bases, providing easy removal of the preconfigured decorative ornament assemblies from the housing.

* * * * *